United States Patent
Abu-Hakima et al.

(10) Patent No.: US 9,215,217 B2
(45) Date of Patent: Dec. 15, 2015

(54) AUTO-DISCOVERY OF DIVERSE COMMUNICATIONS DEVICES FOR ALERT BROADCASTING

(75) Inventors: Suhayya Abu-Hakima, Kanata (CA); Kenneth E Grigg, Kanata (CA); Oskar Piskorz, Gloucester (CA); Colin Christie, Nepean (CA); Connie McFarland, Ottawa (CA); Vince Guevremont, Kanata (CA)

(73) Assignee: Suhayya Abu-Hakima and Kenneth E. Grigg, Kanata (CA)

(*) Notice: Subject to any disclaimer, the term of this patent is extended or adjusted under 35 U.S.C. 154(b) by 823 days.

(21) Appl. No.: 12/757,799

(22) Filed: Apr. 9, 2010

(65) Prior Publication Data

US 2010/0199188 A1 Aug. 5, 2010

Related U.S. Application Data

(63) Continuation-in-part of application No. 12/329,448, filed on Dec. 5, 2008.

(51) Int. Cl.
*G06F 15/16* (2006.01)
*H04L 29/06* (2006.01)
(Continued)

(52) U.S. Cl.
CPC ........ *H04L 63/0428* (2013.01); *H04L 12/1895* (2013.01); *H04L 67/18* (2013.01); *H04L 67/26* (2013.01); *H04W 4/02* (2013.01); *H04W 4/021* (2013.01)

(58) Field of Classification Search
CPC . H04L 67/26; H04L 63/0428; H04L 12/1895; H04L 67/18; H04W 4/021; H04W 4/02
USPC .......................................... 709/206
See application file for complete search history.

(56) References Cited

U.S. PATENT DOCUMENTS

| 5,708,909 A | 1/1998 | Yamashita et al. |
| 5,790,789 A | 8/1998 | Suarez |

(Continued)

FOREIGN PATENT DOCUMENTS

| CA | 2222594 A1 | 5/1996 |
| CA | 2505223 | 6/2004 |

(Continued)

OTHER PUBLICATIONS

Office Action relating to U.S. Appl. No. 12/329,448 dated Mar. 8, 2012.

(Continued)

*Primary Examiner* — June Sison
*Assistant Examiner* — Steven Nguyen
(74) *Attorney, Agent, or Firm* — Oppedahl Patent Law Firm LLC

(57) ABSTRACT

Methods and systems for communicating messages to target communications devices in a target physical location are disclosed. Network sources are queried for logical locations accessible to the network source. A specification of a physical location associated with each logical location is received. Each logical location specification is stored in a data store in association with the associated physical location specification. A specification of the target physical location is received. Those logical location specifications associated with the target physical location are retrieved from the data store, thereby identifying target logical locations. For each target logical location, at least one of the network sources accessible to that logical location is queried for specifications of communications devices accessible to that logical location, thereby identifying the communications devices in the target physical location. The message is communicated to the target communications devices in the target physical location via at least one of the target logical locations.

22 Claims, 13 Drawing Sheets

(51) Int. Cl.
  *H04L 12/18* (2006.01)
  *H04W 4/02* (2009.01)
  *H04L 29/08* (2006.01)

(56) References Cited

U.S. PATENT DOCUMENTS

| | | | |
|---|---|---|---|
| 5,825,759 | A | 10/1998 | Liu |
| 6,108,686 | A | 8/2000 | Williams, Jr. |
| 6,192,354 | B1 | 2/2001 | Bigus et al. |
| 6,208,986 | B1 | 3/2001 | Schneck et al. |
| 6,263,358 | B1 | 7/2001 | Lee et al. |
| 6,401,080 | B1 | 6/2002 | Bigus et al. |
| 6,427,063 | B1 | 7/2002 | Cook et al. |
| 6,499,021 | B1 | 12/2002 | Abu-Hakima |
| 6,513,059 | B1 | 1/2003 | Gupta et al. |
| 6,691,151 | B1 | 2/2004 | Cheyer et al. |
| 6,728,758 | B2 | 4/2004 | Sato |
| 6,820,237 | B1 | 11/2004 | Abu-Hakima |
| 6,823,331 | B1 | 11/2004 | Abu-Hakima |
| 6,832,263 | B2 | 12/2004 | Polizzi et al. |
| 7,010,303 | B2 | 3/2006 | Lewis et al. |
| 7,034,691 | B1 | 4/2006 | Rapaport et al. |
| 7,035,871 | B2 | 4/2006 | Hunt et al. |
| 7,036,128 | B1 | 4/2006 | Julia et al. |
| 7,062,723 | B2 | 6/2006 | Smith et al. |
| 7,069,259 | B2 | 6/2006 | Horvitz et al. |
| 7,069,560 | B1 | 6/2006 | Cheyer et al. |
| 7,073,129 | B1 | 7/2006 | Robarts et al. |
| 7,085,588 | B1 | 8/2006 | Pfister et al. |
| 7,103,580 | B1 | 9/2006 | Batachia et al. |
| 7,130,887 | B2 | 10/2006 | Goldberg |
| 7,133,869 | B2 | 11/2006 | Bryan et al. |
| 7,165,093 | B2 | 1/2007 | Smith et al. |
| 7,181,017 | B1 | 2/2007 | Nagel et al. |
| 7,301,450 | B2 | 11/2007 | Carrino |
| 7,301,914 | B2 | 11/2007 | Segal et al. |
| 7,398,327 | B2 | 7/2008 | Lee |
| 7,409,428 | B1 | 8/2008 | Brabec et al. |
| 7,584,244 | B2 | 9/2009 | Forstadius |
| 7,664,233 | B1 | 2/2010 | Kirchmeier et al. |
| 7,672,991 | B2 | 3/2010 | Moreau et al. |
| 7,685,265 | B1 | 3/2010 | Nguyen et al. |
| 7,965,842 | B2 | 6/2011 | Whelan et al. |
| 8,051,057 | B2 | 11/2011 | Abu-Hakima et al. |
| 8,065,173 | B2 | 11/2011 | Abu-Hakima et al. |
| 8,291,011 | B2 | 10/2012 | Abu-Hakima et al. |
| 2002/0129354 | A1 | 9/2002 | Bryan et al. |
| 2002/0169797 | A1 | 11/2002 | Hedge et al. |
| 2003/0078980 | A1 | 4/2003 | Carstens et al. |
| 2003/0193967 | A1 | 10/2003 | Fenton et al. |
| 2004/0030741 | A1 | 2/2004 | Wolton et al. |
| 2004/0064566 | A1 | 4/2004 | Striemer |
| 2004/0080768 | A1 | 4/2004 | Larson |
| 2004/0140989 | A1 | 7/2004 | Papageorge |
| 2004/0193617 | A1 | 9/2004 | Adler |
| 2004/0243844 | A1* | 12/2004 | Adkins .................... 713/201 |
| 2005/0013417 | A1* | 1/2005 | Zimmers et al. .............. 379/37 |
| 2005/0141706 | A1 | 6/2005 | Regli et al. |
| 2005/0227672 | A1 | 10/2005 | Lauzon et al. |
| 2005/0272368 | A1* | 12/2005 | Langsenkamp et al. ..... 455/12.1 |
| 2006/0010218 | A1 | 1/2006 | Turcotte |
| 2006/0072505 | A1 | 4/2006 | Carrillo et al. |
| 2006/0090013 | A1 | 4/2006 | Achacoco et al. |
| 2006/0109113 | A1 | 5/2006 | Reyes et al. |
| 2006/0146731 | A1 | 7/2006 | Lewis et al. |
| 2006/0161635 | A1 | 7/2006 | Lamkin et al. |
| 2006/0167917 | A1 | 7/2006 | Solomon |
| 2006/0173959 | A1 | 8/2006 | McKelvie et al. |
| 2006/0234672 | A1 | 10/2006 | Adler |
| 2006/0271997 | A1 | 11/2006 | Jacoby et al. |
| 2006/0273893 | A1* | 12/2006 | Warner .................... 340/531 |
| 2007/0002736 | A1 | 1/2007 | Gade et al. |
| 2007/0083561 | A1 | 4/2007 | Lai et al. |
| 2007/0123256 | A1 | 5/2007 | Whitesell et al. |
| 2007/0156824 | A1 | 7/2007 | Thompson |
| 2007/0171881 | A1 | 7/2007 | Zhang et al. |
| 2007/0209054 | A1 | 9/2007 | Cassanova |
| 2007/0220553 | A1 | 9/2007 | Branam et al. |
| 2007/0250591 | A1 | 10/2007 | Milic-Frayling et al. |
| 2008/0066082 | A1 | 3/2008 | Choi |
| 2008/0132216 | A1* | 6/2008 | Kronlund et al. ............. 455/417 |
| 2008/0162637 | A1 | 7/2008 | Adamczyk et al. |
| 2008/0243619 | A1 | 10/2008 | Sharman et al. |
| 2009/0055220 | A1 | 2/2009 | Rapaport et al. |
| 2009/0144104 | A1* | 6/2009 | Johnson ...................... 705/7 |
| 2009/0163183 | A1 | 6/2009 | O'Donoghue et al. |
| 2009/0239497 | A1 | 9/2009 | Sennett et al. |
| 2009/0247111 | A1 | 10/2009 | Sennett et al. |
| 2009/0247116 | A1* | 10/2009 | Sennett et al. ............. 455/404.2 |
| 2009/0325538 | A1 | 12/2009 | Senett et al. |
| 2010/0073161 | A1* | 3/2010 | Engel ...................... 340/540 |
| 2010/0146057 | A1 | 6/2010 | Abu-Hakima et al. |
| 2010/0199188 | A1 | 8/2010 | Abu-Hakima et al. |
| 2010/0306061 | A1 | 12/2010 | Wagner |
| 2011/0119371 | A1 | 5/2011 | Toshima et al. |
| 2012/0190325 | A1 | 7/2012 | Abu-Hakima et al. |

FOREIGN PATENT DOCUMENTS

| | | |
|---|---|---|
| CA | 2460270 | 10/2004 |
| DE | 10032055 A1 | 2/2002 |
| EP | 1320229 A2 | 6/2003 |
| EP | 1686441 A1 | 8/2006 |
| EP | 1718034 A1 | 11/2006 |
| EP | 2124493 | 11/2009 |
| FR | 2849948 | 7/2004 |
| WO | 2009/070882 | 6/2009 |
| WO | 2009070882 | 6/2009 |
| WO | 2009/117455 | 9/2009 |

OTHER PUBLICATIONS

International Search Report from PCT application No. PCT/CA2007/002197; search completion date Sep. 2, 2008; mailing date Sep. 3, 2008.

International Search Report from PCT application No. PCT/CA2008/002119; search completion date Feb. 13, 2009; mailing date Mar. 16, 2009.

International Search Report and Written Opinion relating to international application No. PCT/CA2010/000510 with international filing date Apr. 9, 2010.

Office Action relating to U.S. Appl. No. 12/329,448 with filing date Dec. 5, 2008.

Office Action relating to U.S. Appl. No. 12/329,448 dated Mar. 22, 2011.

Office Action dated Nov. 14, 2011 relating to U.S. Appl. No. 12/329,448 with filing date Dec. 5, 2008.

European Search Report and opinion dated Sep. 18, 2014 relating to European application No. EP 10849198 filed from International application No. PCT/CA2010/000510 with International filing date Apr. 9, 2010.

Extended European Search Report issued for European Patent Application No. 07816073 dated Oct. 28, 2013.

Extended European Search Report issued for European Patent Application No. 08857249 dated Sep. 6, 2013.

International Search Report issued for PCT International Patent Application No. PCT/CA2007/001923 dated Jul. 7, 2008.

International Search Report issued for PCT International Patent Application No. PCT/CA2013/050276 dated Jul. 5, 2013.

MacSkassy et al., "Information Valets for Intelligent Information Access", AAAI 2000 Spring Symposium on Adaptive User Interfaces.

Melville et al., "Content-Boosted Collaborative Filtering for Improved Recommendations". Proceedings of the Eighteenth National Conference on Artificial Intelligence (AAAI-2002), pp. 187-192, Edmonton, Alberta, Canada, Jul. 2002, University of Texas at Austin.

Office Action dated Mar. 28, 2011 issued for U.S. Pat. No. 8,065,173.

Response to Office Action filed on Jun. 23, 2011 in connection with U.S. Pat. No. 8,065,173.

Notice of Allowance dated Aug. 23, 2011 issued for U.S. Pat. No. 8,065,173.

(56) References Cited

OTHER PUBLICATIONS

Office Action dated Jul. 12, 2010 issued for U.S. Pat. No. 8,051,057.
Response to Office Action filed on Nov. 12, 2010 for U.S. Pat. No. 8,051,057.
Notice of Allowance dated Apr. 21, 2011 issued for U.S. Pat. No. 8,051,057.
Office Action dated Sep. 3, 2010 issued for U.S. Pat. No. 8,291,011.
Response to Office Action filed on Dec. 30, 2010 for U.S. Pat. No. 8,291,011.
Final Rejection issued on Mar. 22, 2011 for U.S. Pat. No. 8,291,011.
Response to Final Rejection filed on May 22, 2011 for U.S. Pat. No. 8,291,011.
Request for Continued Examination filed on May 26, 2011 for U.S. Pat. No. 8,291,011.
Office Action issued on Nov. 14, 2011 for U.S. Pat. No. 8,291,011.
Response to Office Action filed on Dec. 8, 2011 for U.S. Pat. No. 8,291,011.
Office Action issued on Mar. 8, 2012 for U.S. Pat. No. 8,291,011.
Response to Office Action filed on Jun. 7, 2012 for U.S. Pat. No. 8,291,011.
Notice of Allowance issued on Aug. 20, 2012 for U.S. Pat. No. 8,291,011.

* cited by examiner

AUTO-DISCOVERY OF DIVERSE COMMUNICATIONS DEVICES FOR ALERT BROADCASTING

RELATED APPLICATIONS

This application is a continuation-in-part of U.S. patent application Ser. No. 12/329,448 which is pending.

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever.

BACKGROUND OF THE INVENTION

1. Field of the Invention

The invention relates generally to communication systems and methods and more particularly to systems and methods for providing alert broadcasting.

2. Description of the Related Art

It is becoming increasingly important and desirable for societal authorities, such as municipal governments, universities, hospitals, the police, and security firms in large office buildings to be able to notify the people in the area under their control of a specific and unexpected danger. For example, if there is a school shooting, a hostage-taking, a fire, a hazardous chemical spill, a gas leak, an Amber Alert for a missing child, or any other event where the danger relates to a person's proximity, it is crucial that the authorities be able to communicate with as many people in the area as possible in order to warn them, to give them instructions as to how best to avoid the danger, how to avoid causing a diversion of the authorities' resources by becoming entangled in the initial danger or by creating a new peril, and to inform them when a hazardous situation has passed. Additionally, there are often less urgent needs to communicate with communities, such as boil-water advisories, travel advisories, weather advisories, school closings, compliancy notices, etc.

Unfortunately, known systems, such as public radio or television broadcasts, are typically directed to a fixed and limited set of communications devices and do not, therefore, take into account the modern reality that people use of a variety of different communications devices depending on the context. For example, in the case of a school shooting at a university, the police or university security service may broadcast a warning via the university radio or television stations; however, a student wearing headphones studying in a quiet corner of a basement room of a campus library might not receive this warning, and might not be noticed by campus security or passers-by. Unless the student fortuitously encounters another person who has heard the warning, he or she might remain oblivious to a danger which is perilously close. Although the student might possess some other means of communication (e.g. a cellular telephone, smartphone, or a laptop computer connected via WiFi to the school's network), the availability of such means are of little value if the authorities are not equipped to broadcast alerts through such communications means in an efficient and reliable manner.

There is, therefore, a need for a solution that provides for broadcasting alerts to a plurality of diverse communications devices, whether the devices are mobile or stationary, through a plurality of diverse communications means. It would include means for identifying appropriate recipients in connection with each type of communications device, such as by selection from a list or by determining each recipient's presence in a particular area. The solution should be configured to maximally utilize the capabilities of any device type, but also take into account the limitations presented by any other device type, and specifically should be capable of transmitting images, audio, video or documents when available. It would also be desirable for such a solution to be able to confirm receipt of the alert, to allow a response from the recipient to the broadcast source to give situational intelligence, and to allow a two-way discussion between the broadcast source and recipients to help direct them through the emergency. Furthermore, it should not enable a new pathway for "spam" or other unsolicited or undesirable information to reach the user.

Broadcasting an alert message to as many recipients as possible within a particular physical area poses an especially difficult problem in a public setting as it cannot easily be determined ahead of time what persons will be in the area and what communications devices they will bring with them. Additionally, many such recipients may be strangers to the area and any societal authority associated with the area, and so there may be no advance notice that they will be in that area. There is, therefore, a need for a solution which identifies as many potential recipients in a physical area as possible across as many communications means as possible regardless of whether such recipients are associated or unassociated with any societal authority, and whether or not any communications devices carried by such recipients are associated or unassociated with any communications nodes accessible by the societal authority.

Furthermore, since any transient people in the area are likely to have communications devices which are not associated with an alert broadcasting system of the societal authority, such communications devices are unlikely to be preconfigured to receive and display any alert broadcast by the societal authority. The problem remains, therefore, that a potential recipient may be identified, but no alert message may be displayed on their communications device. There is a need, therefore, for a solution which provides means for displaying an alert message on an unassociated communications device, or a communications device otherwise not preconfigured to receive the alert message.

Such a solution would also be useful for community-oriented, non-emergency situations, such as public announcement alerts in schools, from police about traffic situations, etc.

BRIEF SUMMARY OF THE INVENTION

The within-disclosed invention includes a system which enables an authority using the system, such as a municipal government, a university, a hospital, the police, or a security firm, to broadcast an alert to a plurality of users who are using a diversity of communications devices, through a diversity of communications means, to confirm receipt of the alert, and to ensure that such does not create an additional communications pathway for spam or other unwanted communication. The system is adaptable to broadcast an alert to any desired communications technology capable of receiving and displaying messages, such as fixed or mobile IP-connected devices (e.g. mobile or stationary computers, handhelds, smartphones, etc), SMS/MMS-capable devices, e-mail-capable devices, voice-capable devices (telephones, radios, etc.), or image-capable devices (e.g. televisions, monitors, smartboards, etc.). Such alert messages may include text, pictures, video, voice, or any other method of communications.

The invention enables efficient broadcasting of messages to a large number of recipient devices, both mobile and stationary. Recipients may be selected by their presence in a list within a database, within a directory, within a set of devices associated with a wireless network controller or access point, or within a set of devices found to be located within a geographical region. Broadcast messages may be prioritized to indicate preferential delivery order. Reception of the broadcast may be explicitly confirmed by the recipient (e.g. by a DTMF signal, by an SMS/MMS response, or by an e-mail response), or implicitly confirmed by the broadcast client.

In order to enable efficient broadcasting of messages to as many recipient devices as possible within a geographical area, or physical location, the invention additionally provides means for automatic discovery of selectable target locations associated with a plurality of communications nodes including a diversity of communications technologies. The invention further provides means for automatic discovery of recipient communications devices of a plurality of device types associated with these communications nodes and associated with the selectable target locations. The invention further provides means for communicating alert messages to, and receiving responses from, the discovered recipient communications devices whether such devices are preconfigured to receive the alert messages or are unassociated with the broadcasting authority or the communications nodes.

In a first embodiment, the invention provides a method of communicating a message to a target communications device in a target physical location. The method includes the following steps. A network source is queried for logical locations accessible to the network source. For each of the logical locations, a specification is received of a physical location associated with that logical location. Each logical location specification is stored in a database in association with the associated physical location specification. A specification of the target physical location is received. Those logical location specifications associated with the target physical location are retrieved from the database, thereby identifying target logical locations. For each target logical location, at least one of the network sources accessible to that logical location is queried for specifications of communications devices accessible to that logical location, thereby identifying the communications devices in the target physical location, the target communications device being one of the communications devices in the target physical location. The message is communicated to the target communications device in the target physical location via at least one of the target logical locations.

In further embodiments based on the first embodiment, above, the following options may be included. Each logical location may include at least part of a network. At least one logical location may include a subnet, a VLAN, an access point, a switch port, a cell tower, or an Internet hub. The specification of the physical location associated with each logical location may be received from a particular communications device representing that logical location or from at least one of the network sources accessible to that logical location. The network source may include a wired LAN controller, a wireless LAN controller, a DHCP server, a DNS server, an SNMP server, an e-mail server, a geo-location service, a cellular location service, a VoIP call server, an intelligent switch, a router, a directory, a database, a gateway, or a protocol packet. The network source may provide hostnames of communications devices associated with the logical locations accessible to the network source, and receiving the physical location associated with a particular one of the logical locations accessible to that network source may include resolving the physical location from a hostname of at least one of the communications devices associated with that logical location. The network source may be a wired or wireless IP network, and querying that IP network for the logical locations accessible to that IP network may include monitoring that IP network for DHCP IP address lease allocation and de-allocation packets, and determining therefrom a list of subnets or VLANs with active IP leases. The network source may be a wired or wireless IP network, and querying that IP network for the logical locations accessible to that IP network may include monitoring that IP network for SNMP packets. The network source may be a wired or wireless IP network, and querying that IP network for the logical locations accessible to that IP network may include querying a call manager to identify voice-over-IP ("VoIP") phones or groupings, or monitoring that IP network for VoIP protocol call server registrations and de-registrations to identify VoIP phones or groupings. Each of the communications device specifications may include an address of the corresponding communications device. Each of the communications device specifications may include a specification of a device type of the corresponding communications device. The physical location associated with at least one of the logical locations may be received from at least one of the network sources accessible to that logical location, a user, a geo-location service, or may be resolved from the logical location specification. Querying the network source for logical locations accessible to the network source may exclude querying any database including the first-mentioned database, above, or another database different from that database. Communicating the message to the target communications device may constitute an alert message communication, and the method may further include the step of storing in the database a record associated with the alert message communication including the message, the target physical location specification, the target logical location specifications, the specifications of the communications devices in the target physical location, the target communications device specification, and any receipt acknowledgement or two-way communications recording.

A second embodiment of the invention provides a method including the steps of the first embodiment, above, as well as the following steps. A specification of a target grouping identifying group member communications devices is retrieved, the target communications device being one of the group member communications devices. Before communicating the message to the target communications device, it is determined that the target communications device is one of the group communications devices of the target grouping. The target grouping may identify a set of logically associated users, each user being associated with at least one of the group communications devices. The set of logically associated users may include a distribution list in a directory or a list of users sharing a network service.

A third embodiment of the invention provides a method including the steps of the first embodiment, above, as well as the following steps. In this third embodiment, a second target communications device operates a client. A specification of a current physical location associated with the second target communications device is received from the client of the second target communications device, that current physical location being the target physical location. A specification of the second target communications device is stored in the database in association with the target physical location specification. The specification of the second target communications device associated with the target physical location is retrieved from the database, thereby identifying the second target communications device as being in the target physical location. The message is communicated to the second target communications device using the client operating on the second target communications device.

A fourth embodiment of the invention provides a method including the steps of the first embodiment, above, as well as the following steps. In this fourth embodiment, the target communications device is unassociated with the particular logical location which identified that communications device. The step of communicating the message to the target communications device via that logical location includes the following steps. The message is provided in a network resource accessible to the target communications device. A network service announcement message is transmitted to the target communications device from a particular network source accessible to the particular logical location. The announcement message contains an instruction for accessing the network resource thereby causing the message to be displayed on the target communications device when the target communications device accesses the network source. The network resource may be a network gateway web page containing the message, and the instruction may request a user of the target communications device to connect to a network controlled by the network gateway and to open a web browser on the target communications device thereby causing the network gateway to cause the web page to display on the target communications device.

A fifth embodiment of the invention provides a system for communicating a message to a plurality of communications devices in a selected physical location. Each device is a respective one of a plurality of device types and has a respective address. The system includes a location discovery module, a recipient discovery module, a delivery module, and a database. The location discovery module is for querying a plurality of network sources for specifications of logical locations accessible to the network sources, and for receiving, for each logical location, a specification of a physical location associated with that logical location; the location discovery module is further for storing in a database the logical location specifications in association with the physical location specifications. The recipient discovery module is for receiving a specification of the selected physical location, for retrieving from the database the logical location specifications associated with physical location specifications corresponding to the selected physical location, thereby identifying selected logical locations, and for querying the network sources associated with each of the selected logical locations for specifications of all communications devices in the selected physical location, thereby identifying selected communications devices, the specifications of the selected communications devices including, for each communications device, the device type and address of that communications device. The delivery module is for receiving the message, the specifications of the selected communications devices, and for communicating the message to the devices. The delivery module has for each device type a corresponding delivery sub-module for communicating the message to the devices of that device type. The database is for receiving and storing the message, the specification of the selected physical location, the logical location specifications and associated physical locations, an identifier for each recipient, and the selected communications device specifications including the device types and the device addresses.

A sixth embodiment of the invention provides a system for communicating an alert message to a plurality of communications devices in a selected physical location. Each device is a respective one of a plurality of device types, and has a respective address. The system includes dispatch means, an agent framework, and a database. The dispatch means is for receiving the alert message and for identifying the selected physical location from a plurality of candidate physical locations. The agent framework is operatively connected to the dispatch means and operates a plurality of collaborating autonomous agents including a location discovery agent, a recipient discovery agent, and a plurality of broadcast agents. The location discovery agent is for querying a plurality of network sources for specifications of logical locations accessible to the network sources. The location discovery agent is further for receiving, for each logical location, a specification of a physical location associated with that logical location, and for storing in a database the logical location specifications in association with the physical location specifications, these physical location specifications specifying the candidate physical locations. The recipient discovery agent is for receiving a specification of the selected physical location from the dispatch means, for retrieving from the database the logical location specifications associated with the selected physical location specification, thereby identifying selected logical locations, and for querying the network sources associated with each of the selected logical locations for specifications of communications devices in the selected physical location, thereby identifying selected communications devices, the specification of each selected communications device including the device type and address of that communications device. The plurality of broadcast agents is for receiving from the dispatch means the alert message, the specifications of the selected communications devices, and the device types for those communications devices, and for communicating the message to those communications devices. Each broadcast agent corresponds to a respective one of the device types for communicating the message to the communications devices of that device type. The database is for receiving and storing the alert message, the specification of the selected physical location, the logical location specifications and associated physical location specifications, and the selected communications device specifications including the device types and the device addresses.

A seventh embodiment of the invention provides a method of displaying an alert message on a communications device unassociated with a network gateway. The alert message is provided in a network resource accessible to the communications device. At least one network service announcement message is transmitted from the network gateway to the communications device. The announcement message contains at least one service identifier containing an instruction for accessing the network resource thereby causing the alert message to be displayed on the communications device when the communications device accesses the network resource. The instruction may include an address or name of the network resource, wherein the alert message is displayed on the communications device when the communications device accesses that network resource address. The network resource may be a web page containing the alert message, wherein the alert message is displayed on the communications device when the communications device accesses that web page. The network resource may be a network gateway web page containing the alert message, and the instruction may request a user of the device to connect to the network gateway and open a web browser on the communications device thereby causing the network gateway web page to display on the communications device, wherein the alert message is displayed on the communications device when a user of the communications device connects to the network gateway and opens the web browser. Each service identifier may be prepended with sorting characters to cause the service identifier to be displayed at or near the top of any list of service identifiers displayed on the device by an operating environment of the device. Transmitting the service identifiers from the network gateway to the communications device may cause an operating environment of the communications device to display a dialog box on the communications device, the dialog box displaying the service identifiers. At least one of the service identifiers may contain the alert message.

BRIEF DESCRIPTION OF THE DRAWINGS

An understanding of the exemplary embodiments will be obtained from the following description, with reference to the following drawings in which.

DETAILED DESCRIPTION OF EXEMPLARY EMBODIMENTS OF THE INVENTION

Figure 1:
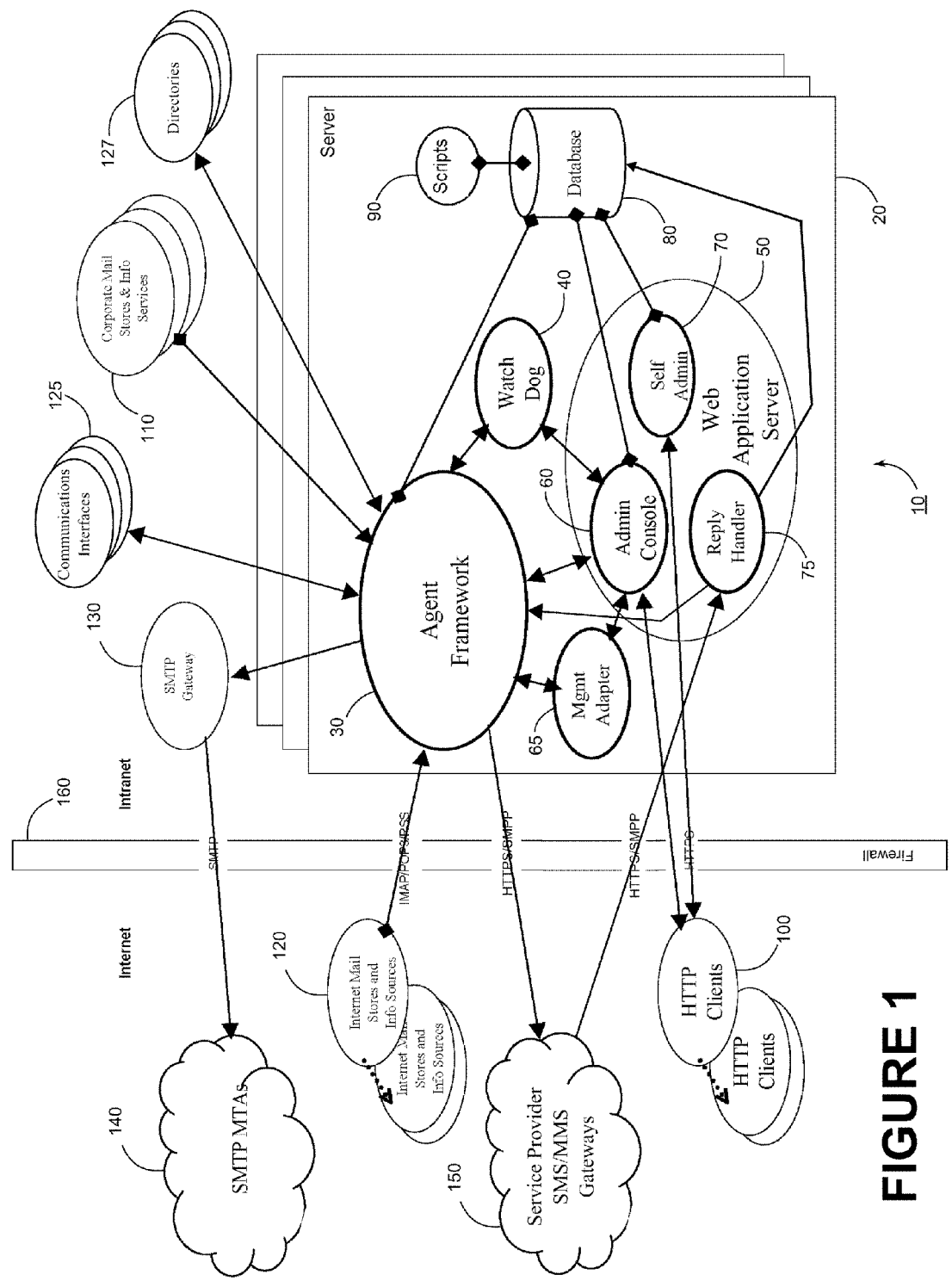
FIG. 1 shows a schematic diagram illustrating an exemplary system employing an agent framework particularly configured for alert message broadcasting in accordance with the present invention.

The advantages of the invention may be obtained through the exemplary systems described hereinafter with reference to the drawings. Where appropriate, the same reference numerals are used in the drawings to indicate like features in all of the drawings.

Exemplary System Overview

The system provides for the prioritized broadcast of alert messages to selected groups of recipients and their communications devices. Recipient profiles are maintained variously in databases, directories, and communications nodes accessible by the system. Communication nodes may additionally report transient recipient profiles. These sources are queried for the identification of selectable groups, which are then presented to a dispatcher (e.g. a system administrator or other broadcast authority) for choosing the recipients. The alert message is then provided to a delivery module which employs a plurality of included modules each of which is configured to communicate the alert message to a corresponding target device type. A response handler module then receives responses from the target devices for later reporting.

As used herein, "communications device" includes any device capable of communications, including portable and/or handheld devices such as cellular telephones, smartphones, pagers, portable or stationary computers including laptop computers or workstations, headphone and earbuds (including those capable of Bluetooth™ communication), network printers, network displays, netbooks (e.g. iPad™, XO™) as well as special-purpose sensor or control devices.

The system may further provide target location and target device auto-discovery, wherein the system accesses any and all communications nodes and network sources, which may include any communication nodes or protocols capable of providing or retrieving location or device information, accessible to the system and queries for lists of logical locations, including network subdivisions, such as access points, subnets, and VLANs capable of providing access to target devices. In this way the system may be used to compile a list of selectable locations for broadcast of an alert message. When it is decided to broadcast an alert message to a selected one or ones of these locations, the system then queries the communications nodes and network sources for accessible target devices. The system then communicates the alert message to all or as many as possible of the target devices by providing specialized delivery functionality for a diversity of target device types and communications means. The system further provides functionality for causing the alert message to be displayed on target devices which are unassociated with the communications node/access point through which that device is accessed, and which is therefore not preconfigured to receive the alert message. In this way, the system provides means for identifying as many potential recipients in a selected location, and means for causing an alert message to be displayed on as many potential target devices within that location as possible.

The system also provides for the determination of a recipient's context and the processing of alert messages for the intelligent miniaturization or other tailoring thereof for the recipient's communications device or a set of designated delegates' devices, and the forwarding of the processed content to the target device(s).

Exemplary System Components

Figure 7:
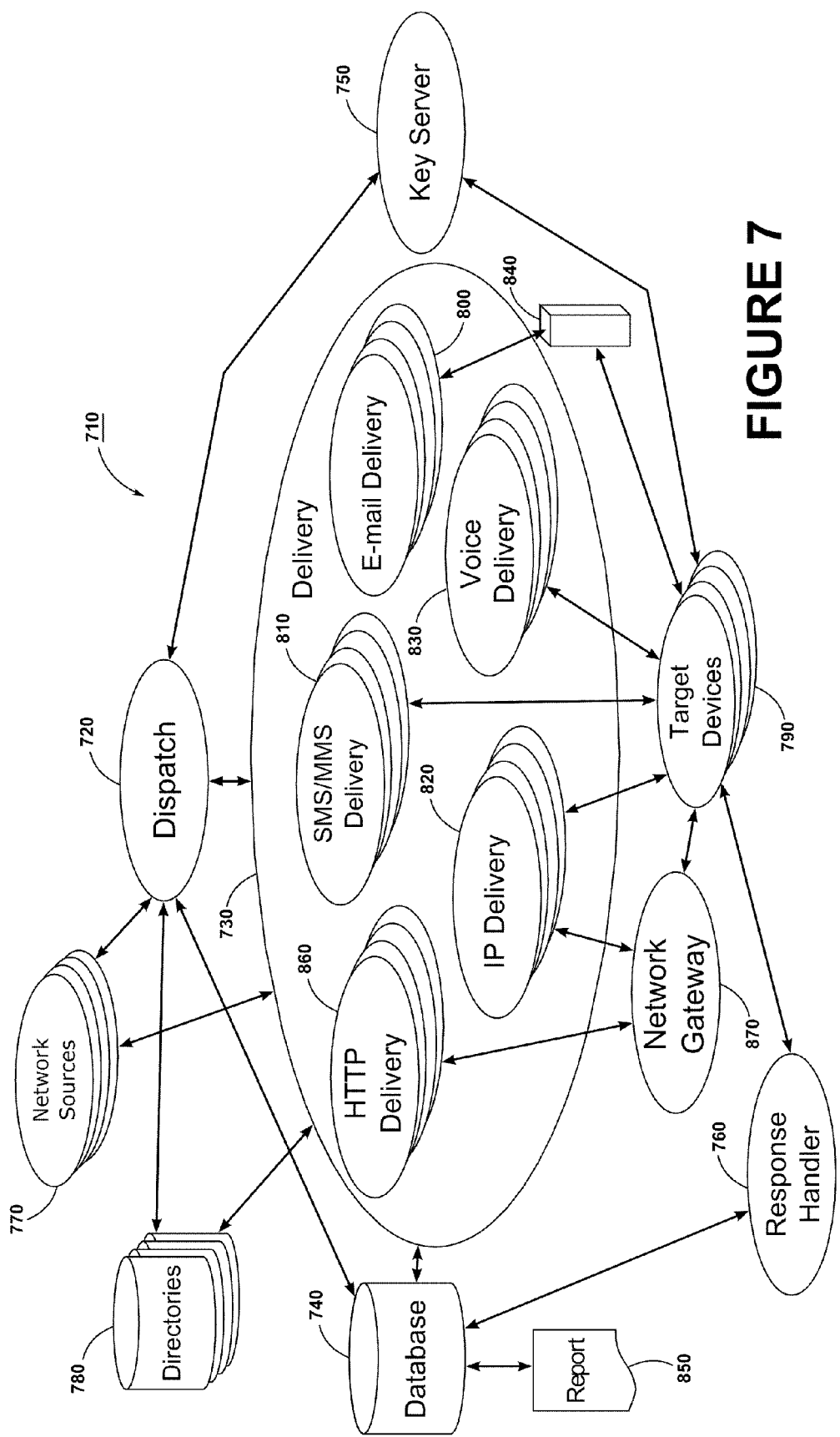
FIG. 7 shows a schematic diagram of an exemplary system for alert message broadcasting to a plurality of different target device types in accordance with the present invention.

FIG. 7 shows a schematic diagram illustrating an exemplary system 710 for broadcasting alert messages to a plurality of communications devices. The system includes a dispatch module 720, a delivery module 730, and a database 740; the system may also include a key server 750 and a response handler 760. As described hereinafter, the system 710 may interface one or more network sources 770 (e.g. communications nodes, network wired/wireless switches and routers, and wired or wireless access points) and one or more external directories 780 (e.g. databases used to identify personnel and network-attached device identities in an enterprise/campus network, telephone directories, directories of client computer hostnames configured in a network domain, or distribution lists). The system 710 further communicates with a plurality of target communications devices 790. As described hereinafter, the target devices 790 may include any communications device capable of receiving an alert message from the system 710.

The delivery module 730 may include or be associated with any number of subsidiary modules (800, 810, 820, 830, 860) each of which is specific to a particular communications technology. For example, the delivery module 730 may include an e-mail delivery module 800, an SMS/MMS delivery module 810, an IP delivery module 820, a voice delivery module 830, and/or an HTTP delivery module 860. As described hereinafter, the delivery module 730 may be extensible to include any additional modules for further known, or as-yet unknown, communications technologies and means.

Figure 8:
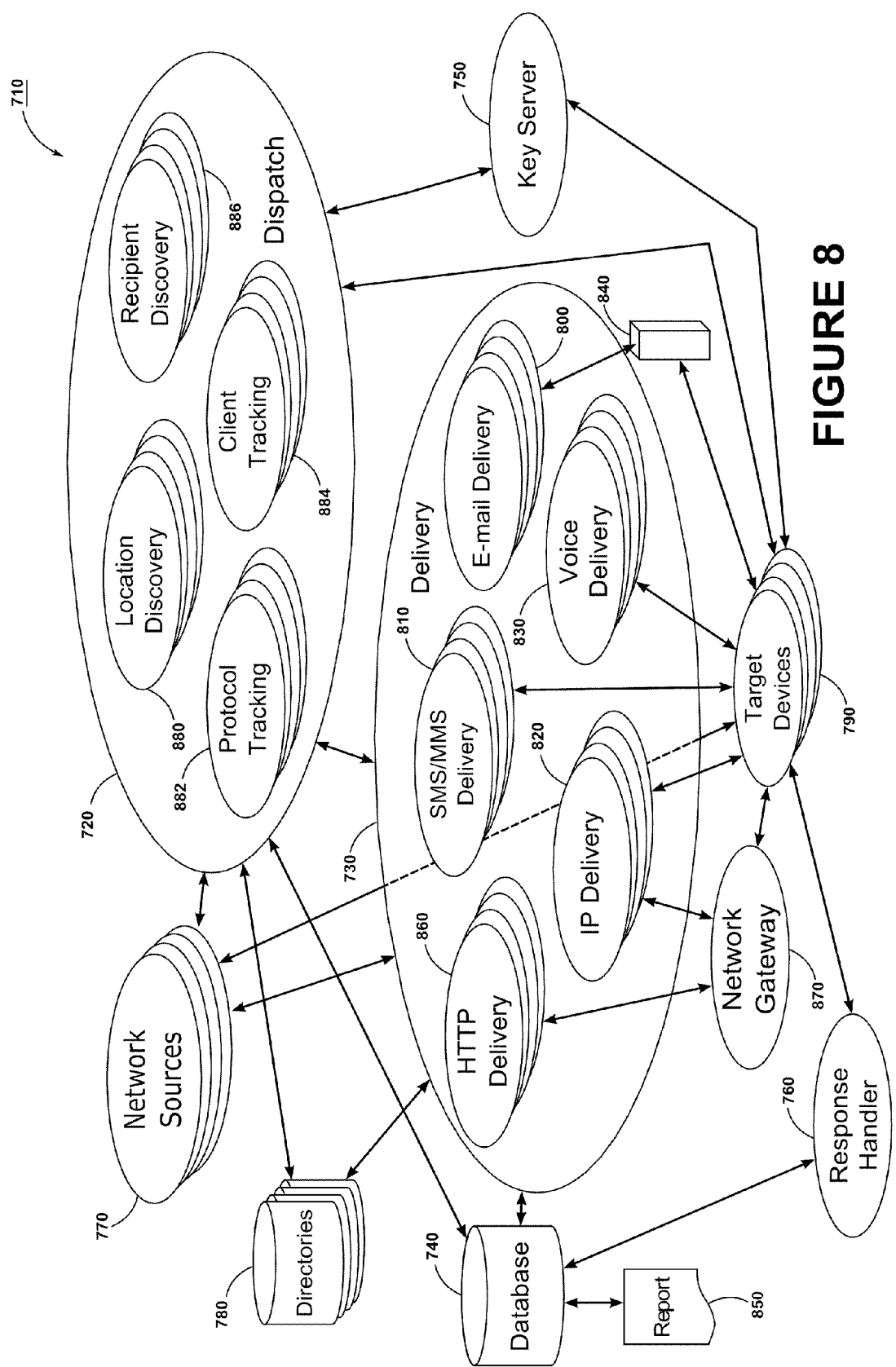
FIG. 8 shows a schematic diagram of an exemplary system for alert message broadcasting to a plurality of different target device types which also provides auto-discovery of selectable target locations and recipient devices, in accordance with the present invention.

FIG. 8 further illustrates the system 710 including functionality for auto-discovery of targetable locations and recipient target devices, including in or associated with the dispatch module 720 a location discovery module 880, a protocol tracking module 882, a client tracking module 884, and a recipient discovery module 885.

Dispatch Module

The dispatch module 720 provides functionality for enabling a dispatcher (e.g. a system administrator or other broadcast authority) to formulate an alert message for broadcast (optionally using pre-configured message templates and optionally including an urgency indication, text, images, audio clips, video clips, and formatting information), to select the intended recipients of the alert message, and to select the methods by which the intended recipients will receive the alert message. The dispatch module 720, therefore, includes functionality for compiling selectable groups of recipients from a plurality of sources for selection by the dispatcher. Any means may be employed to present the dispatcher with such selectable lists, to enable a dispatcher to select or to process such lists to facilitate selection, or to enable the dispatch module to make such selections automatically based on a preconfigured set of selection criteria.

The selectable lists may include lists of subscribers who have previously registered or subscribed, or otherwise indicated that they wish to receive alert broadcasts from the system. For example, the system database 740 may store the particulars of recipients who have previously registered to receive alert broadcasts, and the system may include or interface with any suitable means for enabling such subscription or registration by prospective recipients. The recipient particulars stored in the database may include only some identifier of the registered recipient, or may also include the addresses of one or more communications devices at which the recipient desires to receive such alert messages, and may also include any desired delivery preferences (e.g. so as to specify an order of the recipient's devices in which the system is to attempt delivery of an alert message), though it is to be appreciated that the dispatch module 720 may enable overriding of any such preferences based on additional considerations, e.g. an organizational policy. In the case of such registered recipients, the dispatch module 720 retrieves lists of such registered recipients from the system database 740 for selection, as discussed above.

In general, the dispatch module 720 may provide functionality for the specification of any grouping of individuals or member communications devices for receiving alert messages. While in some situations it may be desirable to communicate an alert message to all or as many as possible of the individuals and/or communications devices in a target physical location or area, in other circumstances it may be desirable to send the message only to individuals and/or communications devices in that physical location which are also members of a predetermined group or are otherwise logically associated. For example, it may be desirable to send a message to all emergency service personnel (e.g. police or security staff) in a physical location, but not to the public generally in that location, in circumstances where it is not known ahead of time which such personnel are present in the physical location, nor which communications devices they may be carrying with them. For such purpose, the dispatch module 720 may access a directory 780 or the database 740 for lists of such group members and/or group member devices in order to compile the intended group members or member devices. Alternatively, a directory 780 or database 740 may associate group member individuals with devices, and this information may be accessed to identify the user of a device identified by the system as being a group member.

Additionally (or alternatively, perhaps for efficiency purposes) the selectable lists may include any keys that are searchable in any of the database 740, the directories 780, and/or the network sources 770. For example, the database may associate subscribers with specific wireless carriers, specific e-mail domains, specific hosting servers, etc. A directory may associate subscribers, non-subscribers, and/or devices (computers) with specific corporate groupings or locations. And a network source might associate specific devices with a specific LAN, virtual LAN, wireless access point, etc. Such keys may specify criteria for identifying the recipients' devices as opposed to identifying specific recipients.

For such purpose, the dispatch module 720 may poll, at the instantiation of the dispatcher, automatically on a periodic basis, on demand, or otherwise, one or more of the directories 780, and retrieve selectable lists of recipients. Such external directories may include telephone directories, a directory of client computer hostnames configured in a network domain (which may further be organized in the directory by, e.g. location), distribution lists of recipients which may be cross-referenced in the database 740 to target specific devices, phone numbers, hostnames, etc., or subscriber directories provided by third-party service providers such as e-mail servers or Internet service providers.

Additionally for such purposes, the dispatch module 720 may also interface one or more network sources 770 accessible to the system 710 which are capable, through such interface, of providing information regarding selectable groups of recipients not necessarily included in the system database 740 (e.g. who have not registered to receive alert broadcasts). In general, the system 710 may employ any known means to ascertain from the one or more network sources 770 recipients who are accessible via any of the means available to the delivery module 730.

For example, one network source 770 may be a network interface point (e.g. a WiFi/WiMAX/HSPA network gateway, a location services interface, or a router/switch), and the dispatch module 720 may poll that network interface to obtain a list of devices (addresses and/or hostnames) accessible via that network or logical locations associated with that network, such as sub-divisions of the network or individual access points. In the event that a device so identified is associated in the database 740 to a registered subscriber, the dispatch module 720 may also retrieve any other of that subscriber's device addresses (e.g. cell phone number, e-mail address) recorded in the database 740 for use in the selection of broadcast message target criteria. For example, an SMS alert might be sent to the cell phones of subscribers whose mobile device (e.g. laptop or smart phone) is associated with a specific WiFi access point. Similarly, an IP-based alert might be sent to the mobile devices of all users associated with all reachable wireless access points within a specific radius of a geographical location (wherein the network source may provide geo-coordinates of each access point.)

Similarly, for recipients using devices in a logical or physical proximity, such as cellular telephones wirelessly connected to a given cellular network node (one of the network sources 770), telephone wires to a given distribution node (another one of the network sources 770), or computers connected wirelessly to a WiFi node (still another one of the network sources 770), such network sources may be configured to cooperate with the system such that the system may query or poll such sources for information regarding any target devices currently accessible via such source, including the addresses of any such devices. Such recipient information and device address may be included in the selectable groups for selection in the dispatch module 720. In such a case, an alert message may be delivered to all or a portion of such devices related by a certain logical or physical proximity to a given communications node. For example, in the case that the devices include cellular and/or land-based telephones, then an alert message may be delivered by the voice delivery 830 module (and/or SMS/MMS Delivery 810 for, e.g. SMS/MMS-enabled cellular phones) to all or a portion of such devices being serviced by a particular cellular network node or a certain land-based telephone network node.

In particular, the system 710 may provide functionality for auto-discovery of selectable locations for alert message broadcasting, and for auto-discovery of accessible target devices within such selected locations, as further described below.

The dispatcher, or the automated dispatch module 720, as the case may be, then selects from the selectable groups or locations compiled in the dispatch module 720 those recipients or the characteristics of recipients to receive a broadcast alert message. The dispatch module 720 then transmits the list, the alert message, and the targeted mobile device types in a data package or any other suitable form, to the delivery module 730 for delivery to the recipients' target devices 790.

For example, the dispatch module 720 may specify the characteristics of the recipients as being customers of a specific wireless carrier in a specific set of area codes. Where a recipient is to receive the alert by e-mail, the e-mail addresses of those recipients are retrieved by the delivery module 730 from the database 740; where a recipient is to receive the alert message by SMS/MMS transmission, the recipient's device address is similarly retrieved from database 740; where a recipient is to receive the alert message by a data network, the device address may be retrieved from a network source 770 or from a directory 780; where a recipient's device is a telephone, the recipient's telephone number may be retrieved from a directory 780, including a particular distribution list in the directory 780.

It is to be appreciated that the dispatch module 720 may further provide the dispatcher the capacity to generate and dispatch alert messages from a location which is remote to the system 710. For example, the dispatch module 720 may additionally provide a secure web portal accessible via the Internet and a web browser, or a telephony interface accessible by calling a number, and further an interface usable by the dispatch to generate an alert message, compile a list of recipients as discussed above, initiate the communication of the alert message to the recipients, and to receive and work with response reports (as discussed below).

As described below, the dispatch module 720 may further interface with a sensor monitoring module or agents for monitoring one or more sensors. In such case, the dispatch module may further be configured to broadcast alert messages based on a message from the sensor monitoring module regarding a change in sensor state. Such functionality may be termed "dynamic alerting". For example, an external system (e.g. an access control system) may report an event (like a door opening) to the dispatch module via the sensor monitoring module or agents. The dispatch module may then reference a database table for an associated location or distribution list that should be informed (e.g. a group as discussed above). The dispatch module may either a) broadcast a canned message to that location/list as if a user had initiated it, or b) perform client discovery, to identify a subset of the users/devices in the location/list that are near (i.e. within a specific radius of) the door and alerts just that subset with the canned message. These features are further described below.

Auto-Discovery of Selectable Target Locations

The system 710 may further include functionality for automatically discovering a plurality of physical locations which may be targeted for broadcast of an alert message. This may include any desired functionality for discovering logical locations accessible via network sources interfacing the system and for associating each such logical location with a scope of physical locations such that recipient devices accessible via the logical location may be targeted based on location.

It is to be appreciated that the term "physical location" used herein may include an area, a plurality of physical locations, a plurality of contiguous physical areas, or a plurality of mutually separated physical areas.

Thus, while such functionality may include an ability directly to identify target devices accessible to the system and capable of receiving an alert message, it is sufficient that it identifies network sources accessible by the system, and the logical locations accessible to the network sources, the logical locations ultimately providing access to target devices, and to associate those logical locations with physical locations for selection by the alert broadcast authority. As used herein, a "logical location" may specify, for example, the entirety or any part of a network providing access to target devices (e.g. subnet, VLAN, access point, switch port). As will be described below, the system provides further functionality for identifying target devices once a target location has been selected by the broadcast authority.

Structurally, this functionality may be provided by any desirable computer constructs including a sub-module of the dispatch module 720, or a further cooperating component of the system. Several embodiments will be described hereinafter, but it is to be understood that any convenient implementation may be selected according to the needs of any particular system.

In the embodiment now described, and with reference to FIG. 8, the target auto-discovery functionality is provided in part by a location discovery module 880, a protocol tracking module 882, and a client tracking module 884. Each such module may represent a single computer construct, or may instead represent a plurality of cooperating modules or agents to provide the functionality described below. Each such module may represent a sub-module of the dispatch module 720, as illustrated in FIG. 8, or may also be an independent component of the system 710 in communication with the dispatch module 720 and other related components.

In general, the system may be configured to interface any and all network sources 770 or communications nodes accessible to the system, such as wired LAN controllers, wireless LAN controllers, DHCP servers, DNS servers, SNMP servers, email servers, geo-location services, cellular location services, VoIP (voice-over-IP) call servers, intelligent switches, routers, directories 780, databases 740, network gateways 870, and protocol packets, authenticate with such sources, and request and receive lists of accessible logical locations including nodes or access points. If any network source is capable of providing physical location information regarding the logical locations, and therefore the target devices, accessible via that network source, then the system 710 may query the network source for that physical location information. Additionally the client tracking module 884 can retrieve GPS location information from GPS-equipped clients, and/or zone-based location information, such as a postal code or other organization-specific zones, when clients have been pre-configured with this information.

Via the dispatch module 720 or otherwise, the location discovery module 880, protocol tracking module 882, and client tracking module 884 may be directed to provide lists of discovered logical or physical locations, either on-demand or periodically, which are then displayed in any one of several visualizations to the dispatcher or other authenticated user. Visualizations may include but are not limited to simple lists, expandable tree structures, and clickable/zoom-able 2D/3D maps.

The location discovery module 880 may provide discovered logical or physical locations from various network sources 770 using specific methods. Examples of such methods follow.

Where the network source 770 is a wireless LAN controller, the location discovery module 880 may query the controller for a list of controlled wireless access points.

Where possible, the location discovery module 880 will use information available, including GPS or geolocation data, network hostnames, zone names, etc., from the controller to determine physical location information for each access point. The list is returned to the dispatch module 720.

Where the network source 770 is a router or intelligent switch, the location discovery module 880 may query the node for a list of networks, subnets, and VLANs supported. The list is returned to the dispatch module 720.

Where the network source 770 is a DHCP server, the location discovery module 880 may query the server for a list of the available networks, network domains, application groups (e.g. available BOOTP servers), VLANs or subnets. The list is returned to the dispatch module 720.

Where the network source 770 is a VoIP call server, the location discovery module 880 queries the server for a list of programmed groups, such as paging zones, call lists, etc. The list is returned to the dispatch module 720.

The location discovery module 880 may then further authenticate with and interface the database 740, then query for unique entries in specific table columns, including any type of grouping information, for providing locations for potential recipients. For example, the database 740 may store and provide specific product names (e.g. associated with customer records providing a customer location), or academic streams (associated with student records in a particular address, e.g. a university campus), or dispatch schedule destinations (associated with specific fleet members), or any other logically-associated individuals or devices.

The location discovery module 880 may also authenticate with one or more directory servers 780, and then query the directory for group information. For example, the location discovery module 880 may query for distribution lists under specific contexts, but this could extend to any type of query such as those indicated above in connection with database searches. Any such discovered list is returned to the dispatch module 720.

Additionally, the location discovery module 880 may access any network sources 770 that provide associated location services in order to determine a physical location associated with that network source or related logical locations (e.g. access points). In such case, the location discovery module authenticates with the service, then queries for the list of locations accessible via that network source. For example, if the network source is a wireless carrier controller providing physical location services, it may be queried to provide physical locations for controlled SMS access points on cellular telephone towers. Similarly, a network source which provides Bluetooth™ broadcast services may provide the location of a communications node. The list is returned to the dispatch module 720.

Physical locations for each of the network sources 770 or logical locations accessible to the network sources 770 may be provided by the network source 770 itself, where possible, or may be predetermined where it is expected that the network source or accessible logical location will be relatively stationary and remain within a scope of physical locations of interest (e.g. a wireless LAN controller or a router in a university building). Pre-determined physical locations may be entered by a user of the system or by any other convenient means, such as a geo-location service or in accordance with a naming convention. In any event, once each network source or logical location (e.g. accessible access point) is associated with a physical location, the database is updated to store the association.

Alternatively, or additionally, the protocol tracking module 882 may provide discovered locations from various network sources using specific methods, and in particular where network sources cannot be directly authenticated and accessed by the system. Examples of such methods follow.

For example, the protocol tracking module 882 may actively monitor a network for DHCP protocol use, such as acknowledgements, indicating device admission and release or expiry from the network.

Alternatively, the protocol tracking module 882 may actively monitor a network for SNMP protocol use, such as Trap packets, indicating device availability and state.

The lists maintained may be returned to the dispatch module 720 periodically or on demand. Association with physical locations may be determined, for example, by reference to geo-location services based on the monitored addresses or by naming convention.

Alternatively or additionally, where particular target devices are preconfigured with a client configured to communicate with the system for providing the alert broadcasting functionality, the client tracking module 884 may also provide discovered locations derived from implicit or explicit communication from the target devices themselves. The client tracking module 884 may maintain a list of the locations reported by the device clients that check in with the module either as a startup or location change action, in response to a pushed notification, or proactive check for posted active alerts. Such device clients may come in many forms, including but not limited to:

notification client software for specific platforms;
notification extensions for specific browsers;

generic browsers;
generic message reception clients, such as SMS message clients, email clients, VoIP clients, Bluetooth message clients, instant messaging clients, and other social networking accounts; and
purpose-built terminals, such as voice channels or message boards.

Notification-specific clients may check in with the client tracking module using standard communications methods such as web service posts or specific socket connections, which may be at predetermined times (e.g. startup, shutdown, when detected location changes, and on a periodic schedule). General-purpose clients and purpose-built terminals may communicate with the client tracking module through any available mechanism such as via monitored accesses to a specific HTTP port, by monitored mailboxes, or by monitored SMS short codes. Such communication from general-purpose clients may be initiated in response to manual input, prompted either by polling messages received or by operational convention (e.g. first responders reporting their new locations).

The client tracking module 884 may employ any available means to obtain physical location information for association with a tracked client device, including:
information provided by the notification client (e.g. GPS coordinates, username, hostname, domain, associated wireless access point, address);
coordinates obtained from geo-location or LAN location services (e.g. GPS coordinates, postal code, city, street address, and/or named zone);
domain names obtained from DNS servers; and
information obtained from a received email/SMS message (e.g. username, email address, grouped short code, grouped mailbox name, specifically tagged location content).

The location list maintained by the client tracking module 884 is then provided to the dispatch module 720 on demand.

As described above, the functionality provided by the location discovery module 880, the protocol tracking module 882, and the client tracking module 884 provides lists of all or as many as possible of the communications nodes, network sources, access points, and target device locations accessible to the system for communicating an alert message. Each communications node, network source, or access point (e.g. cell tower) is associated with a location in which target devices may be accessed thereby, such that a list of selectable locations is provided to the system. While the above-described functionality may include the identification of individual target devices (including, in particular, via the client tracking module), it is contemplated that the system will provide, at this stage, mainly a list of selectable physical locations and not necessarily specific selectable target devices. As described below, once a target physical location is selected, the system then proceeds to auto-discover all or as many as possible of the target devices accessible via the communications nodes, network sources, and access points associated with the selected physical location, and therefore likely to be within that selected location.

Recipient Auto-Discovery Module

Once a list of targetable physical locations has been generated by the system, a broadcast authority may then select a target physical location for broadcasting an alert message. Since the specific target devices have not necessarily been identified by the system, it is further provided with functionality for auto-discovery of all or as many as possible of the target devices accessible in that selected location, or for all or as many as possible of target individuals and/or devices in that selected location that are members of a predetermined group or are otherwise logically associated.

In this regard, it is recognized that, in typical public spaces, the collection of target devices within any particular target location may change constantly, including the entry and exit from the target location of many strangers (and their devices) that may or may not return to that target location. By delaying any identification of the target devices within a target location until such time as it is decided to broadcast an alert message within that location, considerable computing resource savings may be realized, and more people may be reached by the system.

Thus, the system is provided with functionality, which may be embodied in a recipient discovery module 886, which may form a sub-module of the dispatch module 720 or may form a separate module in cooperation with the dispatch module 720 and the other components of the system 710. The recipient discovery module 886 is provided with functionality for determining, based on a user-specified target location from a list of locations, all or as many as possible of the recipient communications devices accessible to the system within that physical location.

Thus, upon the specification of a target physical location (or locations), the system may provide a list of all logical locations, or network sources 770 accessible to those logical locations, associated with that target location. The recipient discovery module 886 then accesses each of these network sources 770 in order to identify all or as many as possible of the target devices 790 accessible via those logical locations. For this purpose, the recipient discovery module 886 may be provided with various functionalities for accessing the identifiable network sources 770 and logical locations according to the specific technology required, and for this purpose may be provided with any number of technology-specific sub-modules.

For example, where the network source 770 is a wireless LAN controller, the recipient discovery module 886 may query the wireless controller for addresses of any devices associated with the targeted access points. Any duplications are removed, groupings are applied, and the list is returned to the dispatch module 720.

Alternatively, where the network source 770 is a router, switch, or DHCP server, then the recipient discovery module 886 may query the source for a list of recipient communications devices connected via this source (or set of cascaded sources) to each of the list of targeted domains, subnets, and/or VLANS provided. Any duplications are removed, groupings are applied, and the list is returned to the dispatch module.

Alternatively, where the network source 770 is a wired or wireless network with access controlled by a network gateway (see below), the recipient discovery module 886 may query the network gateway for device information for each location (e.g. access point or subnet) identified on the requested lists. Any duplications are removed, groupings are applied, and the list is returned to the dispatch module.

Similarly, upon the specification of a target group (or groups), the system may provide a list of all databases 740 and directories 780 associated with the targeted groups. The recipient discovery module 886 then accesses each of these services in order to identify all or as many as possible of the target recipients 790 accessible via each service. For this purpose, the recipient discovery module 886 may be provided with various functionalities for accessing the identifiable services according to the specific technology required, and for this purpose may be provided with any number of technology-specific sub-modules.

For example, where the target is a distribution list retrieved from a directory server 780 by the target location discovery module 880, the recipient discovery module 886 may retrieve recipient device information from the directory 780 for each username identified on the requested distribution lists. This information can include (but is not limited to) username, email addresses, phone numbers, mobile numbers, and computer hostnames. Any duplication may be removed and the list returned to the dispatch module 720.

Where the system has identified a network source 770 which provides location services, as discussed above, then the recipient discovery module 886 may request from the service the list of device identifiers (e.g. phone numbers or network addresses) for the recipient communications devices accessible in any of the listed locations. For example, the locations service of a cellular provider may be queried to provide a list of all cellular telephones or other SMS/MMS/HSPA/WiMAX-capable devices capable of receiving communications within the selected location. Similarly, for any accessible communications nodes providing Bluetooth™ locations services, the recipient discovery module 886 may query the Bluetooth service for a list of device identifiers of recipient Bluetooth devices in the selected location.

In addition, the recipient discovery module 886 may query the protocol tracking module 882 and/or client tracking module 884 for the further lists of active recipient communications devices 790 that they have been tracking within the location(s) selected.

The dispatch module 720 and/or recipient discovery module 886 may have additional functionality to ensure that multiple versions or copies of an alert message are not communicated to a single recipient, or to a single recipient communications device. For example addresses, hostnames, usernames, and other identifiers retrieved from the recipient discovery module 886, client tracking module 884, and protocol tracking module 882 can be resolved against each other to eliminate duplicates, and to provide more contextual mapping to allow multiple recipient communications devices to be linked to each specific recipient. In this fashion, recipients receive one message per device for each broadcast, and the system can determine by which communications devices and technologies each recipient was reached.

Once the recipient discovery module and/or dispatch module have prepared a list of target devices according to the foregoing methods, the dispatch module then forwards the alert message to delivery module 730, along with the list of target devices, their device types, and their associated communication nodes, to transmit the message.

Network Intrusion Detection

As an additional feature of the system, it is noted that the above-described target location and target device auto-discovery functionality enables the collections of periodic automated snapshots of targeted location recipients which can be compared, incrementally, and the changes ("deltas") may be used to identify potential network intrusion. New devices on the network can be listed by device type and grouping, and optionally compared to known white-lists of device addresses.

This functionality may be performed by an intrusion monitoring module (or agent), whose function is to periodically originate test broadcasts and to archive the results for comparisons. The delta reports may be offered on-demand to the console, and/or emailed based on various filters to a reporting mailbox.

Intrusion monitoring agents may also extend the protocol tracking module 882, watching for address duplication (e.g. between different devices), for unexpected address spaces, and for unexpected addresses by specific subnets/VLANs. This can be useful for example to identify rogue devices on a subnet dedicated to VoIP traffic.

Sensor Monitoring

The system may also be provided with modules or other constructs for monitoring sensors which provide notifications or state changes based on specific conditions (e.g. door opening, temperature variance, gas detection), and may operate individually or collectively in separate systems (e.g. "sensor systems") that provide single points of notification for multiple sensors or request forwarding of a particular message.

Thus, the system, including the dispatch module 720, may additionally be provided with a sensor monitoring module for providing grouped listings of connected sensors and/or SNMP clients, listing them by location, sensor/client type, and/or sensor/client name.

Thus, the system may be configured to prepare and broadcast an alert message upon receiving notification of a sensor message, and based on the particulars of the sensor message including location, as noted above.

Delivery Module—Generally

In general, the delivery module 730 receives the alert message, the recipient characteristics (actual device addresses, and/or device types, and/or one or more keys that are queryable in any of the database 740, the directories 780, and/or the associated network sources 770), as described above, from the dispatch module 720.

As indicated above, the delivery module 730 may include or be associated with any number of subsidiary modules each of which is specific to a particular communications technology. Such specific modules may include an e-mail delivery module 800, an SMS/MMS delivery module 810, an IP delivery module 820, an HTTP delivery module 860, and/or a voice delivery module 830, and may further include any other module directed to another different or related technology or communications means, channel or path. In such case, the delivery module 730, upon receiving the alert message from the dispatch module 720, determines with respect to each target device the communication and performance capabilities of the device. Such capabilities may be specified in the data package with respect to each recipient and each target device.

In general, each of the specific delivery modules 800, 810, 820, 830, 860 may perform its functions through a pool of dynamically generated sub-modules or threads. Furthermore, each specific delivery module may contain functionality for tailoring the content of the alert message so as to be receivable and/or more suitable for display by the target device types associated with that specific delivery module. For example, alerts sent by e-mail might be formatted in HTML with embedded logos, attached images/videos/audio, or could be encrypted. Alerts sent by SMS might be groomed to account for different wireless provider and/or device-type capabilities (e.g. some require identification of originator in the body because they do not properly reflect the sender). Alerts sent by IP could contain text, images, video, or audio formatted for rendering on specific devices.

Once delivery of an alert message is completed (including, optionally, receipt of delivery confirmations from the target devices 790—see below), then the delivery module 730 may record such delivery in the database 740. For example, in the case of communication by the voice delivery module 830, then such module may update the database 740 to record the result of an attempted communication with a particular target device 790, e.g. an attempted call to a telephone, with such result including, e.g. unanswered, busy, heard, responding.

Delivery Module—E-Mail

For communicating the alert message to target devices 790 capable of receiving e-mail messages, the delivery module 730 may employ the e-mail delivery module 800. If the particulars received by the delivery module 730 for any particular recipient does not include the recipient's e-mail address, then the delivery module may query the database 740, directories 780, and/or network sources 770 for the e-mail address(es) of that recipient. The e-mail delivery module 800 then transmits the alert message to each such recipient's target device 790 via an optional SMTP Message Transfer Agent or gateway 840 and via that recipient's e-mail server. The database 740 may then be updated to record that such messages have been sent. The e-mail delivery module 800 may also generate a plurality of pooled sub-modules to divide such delivery tasks by volume, interface, or any other desired criterion.

Delivery Module—SMS/MMS

For communicating the alert message to target devices 790 capable of receiving SMS/MMS messages (e.g. cellular telephones or smartphones), the alert message may be handled by the SMS/MMS delivery module 810. This module may query the database 740, directories 780, and/or network sources 770 for telephone numbers or SMS/MMS addresses, and transmit the alert message to the target devices 790 via an SMS gateway or modem. The module may further employ load-balancing across carrier/provider gateways, for example using e-mail (via SMS/MMS-to-e-mail gateways), SMPP messages (via carrier SMS gateways), or SOAP (HTML) posts to carrier/provided gateways. The number of connections may be variable so that the message may be communicated across a variable number of connections. The target device telephone numbers or SMS/MMS addresses may also be provided by the recipient discovery module when the alert message is being broadcast to a location selected from the selectable locations determined by dispatch module, as described above. The SMS/MMS delivery module 810 may then communicate an update to the database 740 indicating the transmission of the alert message to those recipients. The SMS/MMS delivery module 810 may also generate a plurality of pooled sub-modules to divide such delivery tasks by volume, interface, or any other desired criterion.

Delivery Module—Voice

For communicating the alert message to target devices 790 capable of receiving and playing audio recordings (e.g. telephones, public announcement systems, desktop microphones, speaker phones), the alert message may be handled by the voice delivery module 830. This module receives the alert message and, if the alert message does not already identify by reference (or attach) a pre-recorded audio message, it converts the alert message into an audio recording including a voice message based on the textual alert message using any available text-to-voice conversion methods. The voice delivery module 830 may query the database 740 (e.g. for subscribers' telephone numbers), directories 780 (e.g. telephone number directories, including distribution lists), and/or network sources 770 (e.g. a telephone system node which may indicate all telephone numbers accessible though that node) for the addresses of the target devices 790 (e.g. telephone numbers), in the event that such addresses are not provided by the dispatch module 720 in or with the alert message package. The voice delivery module may then generate a plurality of pooled modules or threads to communicate the audio message to the target devices 790. In particular, each such pooled module or thread may communicate with a particular instance of communications equipment for communicating with corresponding types of target devices 790. For example, each such pooled module or thread may communicate with a DTMF/VoIP dialer for dialing the telephone number of a target device to receive the audio message. Zoned paging (e.g. in a PBX or Unified Communications environment) may be used if supported, or otherwise standard auto-dialer technology may be used to individually contact each phone. Each such pooled module or thread may be configured to make any desired number of attempts to complete the communication should it receive, e.g. a busy signal or should a call not be answered. In general, such pooled modules/threads may be generated and apportioned the module's delivery tasks according to any desired criterion. The voice delivery module 830 may then communicate an update to the database 740 indicating the transmission of the alert message to those recipients.

In particular, where the target devices include VoIP phones, the voice delivery module 830 may signal the targeted phones directly, or indirectly via an associated call server, for reception of the multicast streamed audio part of the message. The voice delivery module 830 may also direct the phones to display a text message if they have a display and provide one or more buttons for acknowledgement. Manual activation of an acknowledgement buttons may cause the phone to contact the Response Handler 760 by vendor-specific means as discussed below. Text-to-speech conversion may also be used, as discussed above, for creation of the audio stream. After transmission of the audio part of the message, the voice delivery module 830 may direct the phones to disconnect from the audio stream.

Delivery Module—Client Application

The system 710 may also be configured to cooperate with corresponding alert broadcast clients resident on one or more of the target devices 790. Such clients may be configured to receive the alert message and any associated information from a corresponding specific delivery module 800, 810, 820, 830, 860 associated with the delivery module 730. The client may be configured to retrieve or otherwise take active steps to obtain the alert message (e.g. poll a recipient's e-mail server 840, listen for incoming connections from the IP delivery module 820, or listen for incoming SMS from the SMS/MMS delivery module 810), and may provide co-operating functionality as described hereinafter, e.g. to provide a receipt confirmation and response mechanism, and/or to provide message authentication and security. The system 710, including the delivery module 730 and associated specific delivery modules 800, 810, 820, 830, 860 may be configured to prepare any particular communication to a target device 790 so as to cooperate with such a client, or may instead prepare the communication assuming that no such client is operating on the target device 790 (i.e. relying only upon a minimum capability set for that device).

For example, the IP delivery module 820 may transmit the message to the target devices 790, and may do so by unicast/multicast/broadcast to client applications operating on the devices. Unicast transmissions may be performed via TCP-based handshake or other point-to-point protocol (e.g. as are used by OnStar™ systems). Multicast transmissions may be performed via IP-based or other one-way point-to-multipoint transmission. Broadcast transmissions may be performed via IP-based or other one-way point to all stations transmission. The IP delivery module 820 may then communicate an update to the database 740 indicating the transmission of the alert message to those recipients. The IP delivery module 820 may also generate a plurality of pooled sub-modules to divide such delivery tasks by volume, relevant interface, or any or desired criterion.

For example, a client on a WiFi-enabled device (associated or unassociated) may listen for incoming connections from the IP delivery module 820, accept the connections, receive and process the payload (optionally authenticate, confirm receipt, display), then disconnect, connect back to the response handler 760 with a user response (when applicable), and then prepare for subsequent connections. (Unassociated devices might have to wait for a WiFi association before providing a confirmation and/or response.) A client on a network gateway 870 could operate in a similar fashion, listening for connections from the HTTP delivery module 860 and/or the IP delivery module 820. A client on an SMS/MMS-enabled device would listen for incoming messages from the SMS/MMS delivery module 810, receive and process the message payload in a similar fashion, but receipt and user response would be sent back to the response handler 760 as an SMS/MMS message if configured to do so.

In another method where target location(s) are selected via the target location discovery module, the delivery module may publish the alert message as a new web page to a web server or newsfeed server associated with the system. In addition, a well-known file on the web server, or well-known newsfeed on the newsfeed server, listing the active broadcasts may be updated with the new web page information and the list of applicable locations and/or groupings. Client applications that monitor the server check the well-known file for any newly active message, match their location against the listed ones, then alert the user if appropriate. The client application can determine its own location either through local GPS services, geo-location, or group membership. Client applications that proactively check the web page may determine whether or not messages are still active based on timestamp and longevity values listed with the message in the well-known file.

The delivery module 730 may also interface with and authenticate to any accessible social networking web site or resource and post the alert notification content to a page, to a named group, etc. Examples of such social networking resources include Facebook, Twitter, and instant messaging.

Delivery Module—Clientless Devices

The system 710 may also be configured to provide alert messages to recipient devices 790 that do not have any specific client capable of receiving the alert messages.

In such case, the delivery module 730 may provide the alert message to a network source 770, such as a wireless controller or a domain server, that provides network services. The network source 770 may then be configured in a vendor- and service-specific manner to deliver the message. In this manner, the network source provides the alert message, or a subset of the alert message, such as the alert message subject, as a temporary offering of a new networked service. This may cause the device operating system to provide notifications to the recipient user.

For example, where a wireless target device 790 is within range, but unassociated with, a wireless network, the HTTP delivery module 860 may provide the alert message as a new webpage to a network gateway 870, as discussed above. The delivery module 730 then directs the network gateway 870 to automatically create new connection profiles, populating the profile names (e.g. service set identifiers, or SSIDs) with the alert message subject. The device operating system may then automatically display the alert message subject to the device user. The alert message subject provided in this way may include a statement asking the device user to connect to the profile and open an application, e.g. a browser, thereby causing the uploaded alert message homepage to display.

Alternatively, where a wired or wireless target device 790 without a specific client is connected to a network served by a domain controller 770, the delivery module 730 may prepare the alert message as a web page. The delivery module may then configure a new service on the domain controller 770, which the domain controller offers to targeted devices 790 on the domain via vendor-specific service offering protocols. For example, the delivery module 730 may configure a new printer service, which may subsequently appear as a desktop pop-up on recipient devices 790 within the domain, informing them of a new alert and offering a URL to the alert message web page.

Alternatively, where a wired or wireless target device 790 without a specific client is connected to a network served by a domain controller 770, the delivery module 730 may prepare the alert message as a vendor-specific administration message. The domain controller may then deliver the alert via vendor-specific messaging protocols.

For example, modern operating systems may provide an ability for an administrator to offer support services remotely, in which case the offer is presented to an end-user as a desktop pop-up. The delivery module 730 may format this service offer to pop-up all or part of the alert message to the user.

Delivery Module—Network Gateway

The system 710 may also be configured to cooperate with network gateways 870 to deliver the alert message to networked devices 790 whose network access is controlled by a network gateway. Network gateways 870 may generally include any network source that controls device access to a network (e.g. wired/wireless controller, cell tower, intelligent switch, router, or firewall). For example, it is known for WiFi deployments in public areas and for wired deployments in hotels to use network gateways to authenticate new users for the purpose, e.g. of obtaining payment information and authorization for access privileges. As described above, such techniques may also be employed in the present system to identify prospective alert message recipients connected to such a communications node and to carry out the delivery of alert messages to them. Further detail of such embodiment is now provided.

For example, a given recipient may be using a computer or handheld wireless device (i.e. that recipient's target device 790) which is networked wirelessly using WiFi or a similar wireless system (i.e. a network source 770) accessible by the dispatch module 720 and delivery module 730 via the network gateway 870.

In such a case, the delivery module 730 provides the alert message, which may be in the form of a new webpage, to the network gateway 870, and may cause the network gateway 870 to redirect newly authenticating recipient computer HTTP sessions to a website, which presents the alert message.

In addition to the above, where the target device identification has been provided by the target location auto-discovery 880 and recipient discovery modules 886, discussed above, the delivery module 730 may format the alert message as a new web page linked to network gateways 870 operating on e.g. wireless controllers or network switches containing the locations (access points or subnets) identified as targets. Multiple notifications may be presented, for example by showing a list of active messages, by having the messages automatically cycle, or by providing "previous" and "next" buttons to cycle between pages. Next the delivery module 730 may request the network gateway to cause web browsers on the target recipient devices to redirect to the web page containing the alert message. The method used to cause browser redirection depends on the capabilities of the specific network gateway. For example, previously authenticated targeted devices may be de-authenticated. In addition, the delivery module 730 may direct the network gateway 870 to re-authenticate de-authenticated devices automatically when the web browser visits the alert web page. The delivery module 730 may query the network gateway 870 to determine which targeted recipients have viewed the alert.

Similarly, the system 710 may also be configured to cooperate with network gateways 870 to deliver the alert message to networked devices 790 whose network access is controlled by a network gateway 870, but where the networked devices have not requested access to the network. Such devices are said to be unassociated with the network.

In such case, the delivery module 730 provides the alert message, which may be in the form of a new webpage, to the network gateway 870, and may cause the network gateway 870 to deliver the message to the unassociated devices 790. This may be accomplished by offering new (and temporary) networked services to the unassociated devices 790, which may cause the device operating system to provide the alert message, or a subset of the alert message, to the recipient use (as discussed above). The client device may then automatically associate with the network, or the device user may manually cause the device to connect with the network.

The delivery module 730 may then deliver the complete alert message to target devices 790 that are configured with alert broadcast client applications. Additionally, the delivery module 730 may configure the network gateway 870 to cause web browsers on the recipient devices 790 without clients to redirect to the alert web page (as discussed above). Alternatively, the recipient user may direct the device browser to the alert message web page using a URL provided with the network services notification.

Response Handler

The system 710 may include a response handler 760 to receive receipt confirmation messages from the target devices 790 and to provide for reporting of the same to the dispatcher, including through the generation of reports 850 which may be include reports useful for compliance with emergency notification laws. Any target device 790 having an alert broadcast client installed or otherwise operating on the device may provide an acknowledgement or other response automatically or at the recipient's command by means of the client.

In general, an alert message may include an acknowledgement request, and may identify to the recipient means for providing a response. Depending on client type, the acknowledgement may include:

a button with embedded HTML to force an HTTP post back to a client tracking module (see above);
a message sent back over a a socket connection to a client tracking module;
a reply over SMS to a monitored short code (or to a monitored mailbox via an SMS gateway);
an email reply to a monitored mailbox;
a button push indication from a tone detector; or
a voicemail.

In particular, in the case of the communication of an alert message to a target device 790 capable of receiving an e-mail message, that target device 790 may, automatically or at the command of the recipient operating that device, send a reply message to a response handler mailbox; such reply message may include merely an acknowledgement of receipt of the alert message, and/or may also include an acknowledgement that the alert message has been read and/or and indication that the recipient is taking some action which may also be specified in the reply message.

In the case of the communication of an alert message to a target device 790 capable of receiving an SMS/MMS message, that target device 790 may, automatically or at the command of the recipient operating that device, send a reply message to a response handler mailbox, if the device has e-mail capability, or to an SMS/MMS short code monitored by the response handler 760. In the case of a monitored mailbox or short code address, a message retrieval agent may poll the mailbox or short code and to parse the response.

If a web page is used to deliver all IP-based message content, the web server logs, showing page accesses, can be parsed to match known IP addresses to provide notification delivery confirmation in the absence of (or prior to receiving) acknowledgements.

In the case of the communication of an alert message to a target device 790 capable of receiving an audio message and also capable of responding with an audio message (e.g. a telephone), the recipient may use the target device to respond with DTMF tones or voice-recognized commands to acknowledge that the audio-encoded alert message was received (e.g. heard), and may also indicate that they are taking action in response to the alert message, which may indicate an indication of what action they are taking. In addition, or alternatively, a response message may be a voice recording which may enable to recipient to indicate that they require assistance in an emergency situation. The voice messages may be obtained by a message retrieval agent interfaced with the voice system, which retrieves voice messages in digital form from mailboxes associated to the specific broadcast, and links them to the broadcast for later retrieval via the system.

In general, any particular target device 790 having sufficient capability may operate an alert broadcast client application configured to receive and process the alert message and to communicate one or more of the above-described receipt, read, and action acknowledgements, as the case may be, automatically or at the command of the recipient operating the target device. Additionally, the target device 790 may be used to communicate additional situational information back to the dispatcher, such as a text, picture, video, or audio message. Such informative responses could be used to provide content for subsequent broadcasts out to the target recipients in an emergency situation in order to provide guidance or just more information.

Furthermore, inasmuch as the receipt by the response hander 760 of an acknowledgement from a particular target device 790 indicates that such target device 790 is 'alive' and ready to receive further communication, then the dispatcher, upon receiving notice from the response handler 760 that the particular target device 790 is alive, may initiate two-way communications with such device 790 via the response module 730, e.g. by generating a further alert message and compiling a recipient list containing only that device 790, or otherwise. Such a facility is of particular advantage where the particular target device 790 had originally responded to the response handler 760 with situational information, and the dispatcher has been able to determine from such situational information that the user of that target device requires specific instructions in order to avoid a danger, or may have or be able to obtain further useful information.

Once the response handler 760 receives an acknowledgement or other response message from a target device 790, it may then update the database 740 with the details of such acknowledgement or response, and may then inform the dispatcher of the response content via the reporting module 850 or otherwise. The results of the delivery and any subsequent acknowledgements may be captured in a database table for later presentation via the console, and/or reported to an archiving mailbox.

Alternative Embodiments

As indicated above, the functionality provided by the system may be embodied in any constructs considered appropriate or desirable to the particular application of the system. For example, an embodiment including an agent framework with a whiteboard messaging system is described below.

Figure 9:
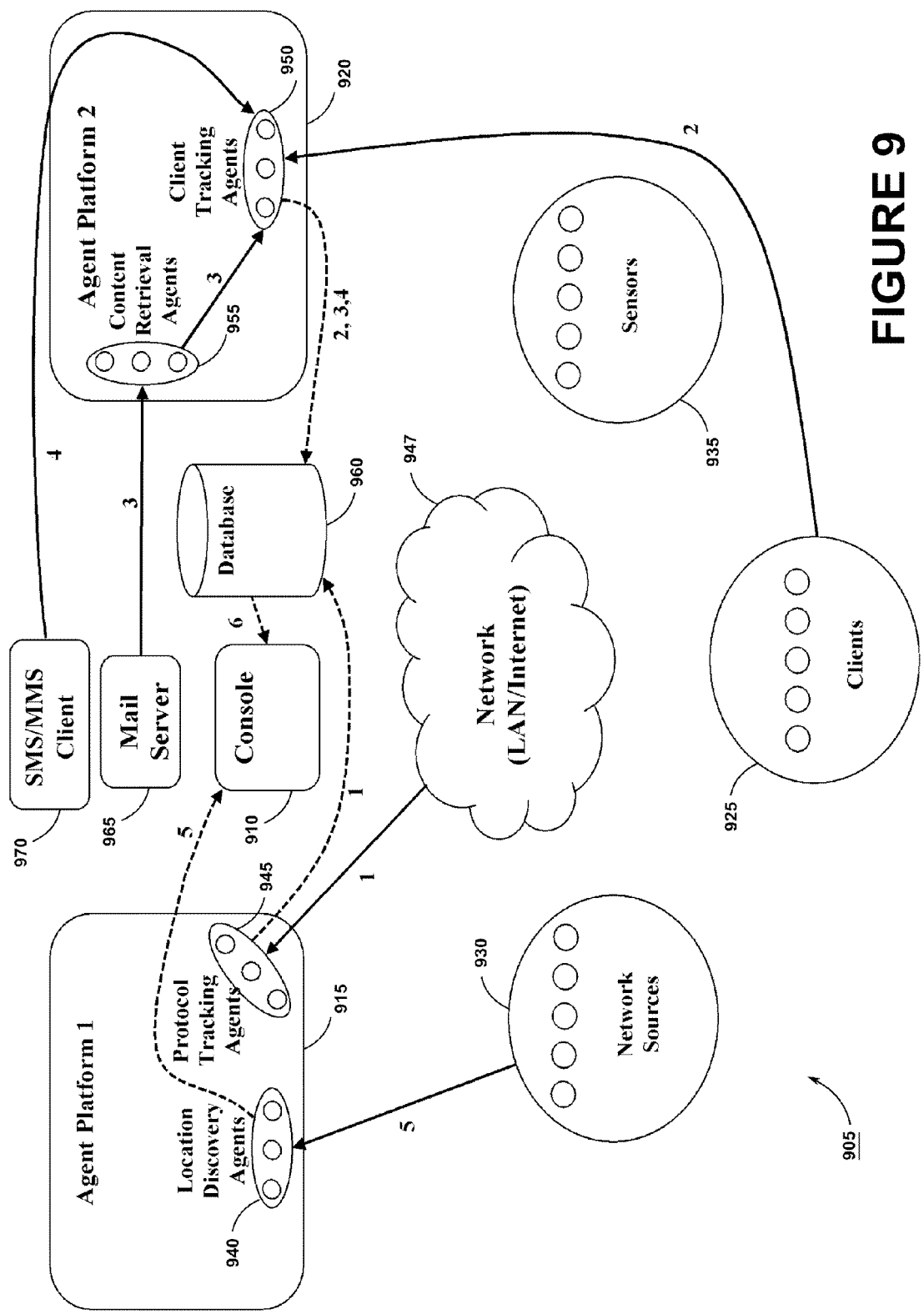
FIG. 9 shows a schematic diagram of another exemplary system for alert message broadcasting to a plurality of different target device types which also provides auto-discovery of selectable target locations, in accordance with the present invention.
Figure 10:
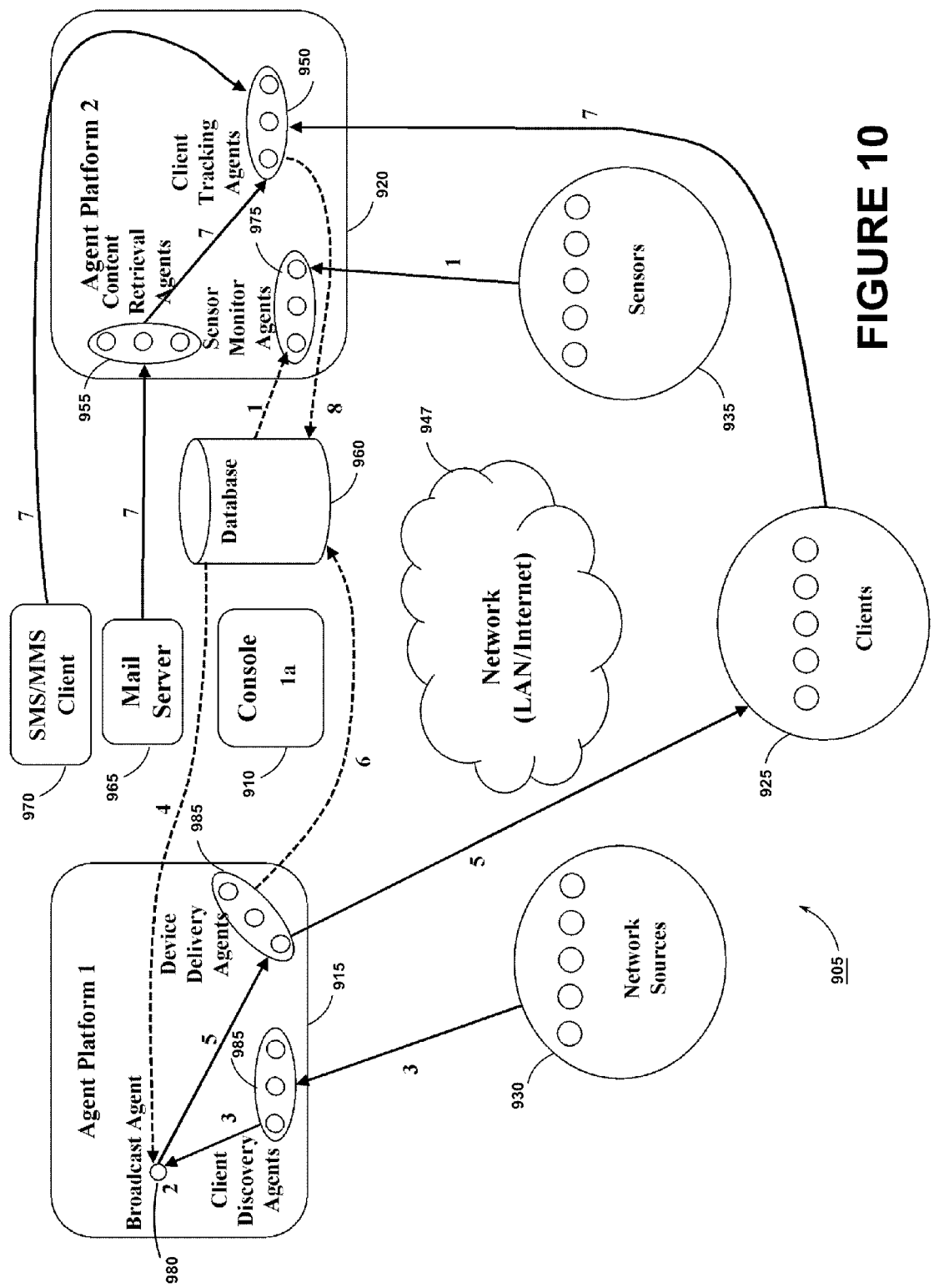
FIG. 10 shows a schematic diagram of the exemplary system of FIG. 9 for alert message broadcasting as it also provides auto-discovery of selectable target devices within a selected location, in accordance with the present invention.

By way of example only, and not for the purpose of limitation, an additional embodiment 905 is illustrated in FIGS. 9 & 10, which also illustrates the flow of processes implemented by the system. In FIG. 9, the components and data flows of the system which provide for auto-discovery of selectable target locations are illustrated. In this embodiment, the system may consist of an administration console 910, as further described below, for controlling the functionality of the location discovery, protocol tracking, and client tracking modules directly, or via the dispatch module, or may alternatively form a part of the dispatch module, or contain the dispatch module. The system may further include one or more sets of co-operating server-based agents/threads ("agent platforms") 915,920, various end-user clients 925 ("clients"), various network information sources 930 ("network sources"), and various event/condition sensors 935 ("sensors"), which may correspond to the components described above. The above-described target location auto-discovery functionality may be provided by location discovery agents 940, protocol tracking agents 945, and client tracking agents 950 which operate in one or more agent platforms (two 915, 920 are shown in FIG. 9 by way of example), and may also or alternatively be located in one of multiple operating environments. As described below, each such agent may represent instead a pool of agents managed by a pool manager. The client tracking agents 950 may further cooperate with content retrieval agents 955, more generally described below.

The processes performed by the location discovery agents 940, protocol tracking agents 945, and client tracking agents 950 are generally as described above, and more particularly as follows, by way of example, with reference to FIG. 9. The protocol tracking agents 945 monitor network traffic 947 and record discovered clients in the database 960 (and remove leaving/expired clients) (flow 1). Target device clients 925 periodically report availability and location to the client tracking agents 950, which record discovered clients in the database 960 (and remove leaving/expired clients) (flow 2). The content retrieval agents 955 monitor mail servers 965 for email-based client updates and report them to the client tracking agents 950 (flow 3). SMS/MMS clients 970 (e.g. first responders) can periodically report availability and location to the client tracking agents 950, which record discovered devices with locations in database 960 (and remove leaving/expired devices) (flow 4). When requested by the console 910 (or periodically), the location discovery agents 940 may query network sources 930 for their targetable locations/zones (flow 5). The console 910 may display tracked client locations and discovered locations as recorded in the database 960 (flow 6).

The processes and data flows performed by the system of this embodiment 905 when an alert broadcast is to be prepared and broadcast are illustrated in FIG. 10. An alert message broadcast may be triggered when a sensor monitor agent 975 detects that a monitored sensor 935 fires and then queries the database 960 for the associated target locations (e.g. a distribution list) (flow 1). Alternatively, a console 910 user initiates a broadcast, passing the selected target locations (flow 1a). A broadcast agent 980 is instantiated to handle the broadcasting function (flow 2). The broadcast agent 980 requests the client lists from the client discovery agents 985, which query the network sources 930 (flow 3). Optionally, the broadcast agent 980 parses the discovered clients for a subset of recipients in the proximity of the sensor alert or location selected by the console user. In addition, the broadcast agent 980 optionally queries the database 960 to match discovered clients to alternative media channels for the recipient (flow 4). The broadcast agent 980 requests device delivery agent 985 services to deliver the messages across the selected media in an optimal way. Those agents deliver the message (flow 5). The device delivery agents 985 record delivery success/failure in the database 960 (flow 6). The recipients acknowledge the message reception (flow 7). The client tracking agents 950 record the acknowledgements in the database 960 for later reporting in the console 910 (flow 8).

Figure 12:
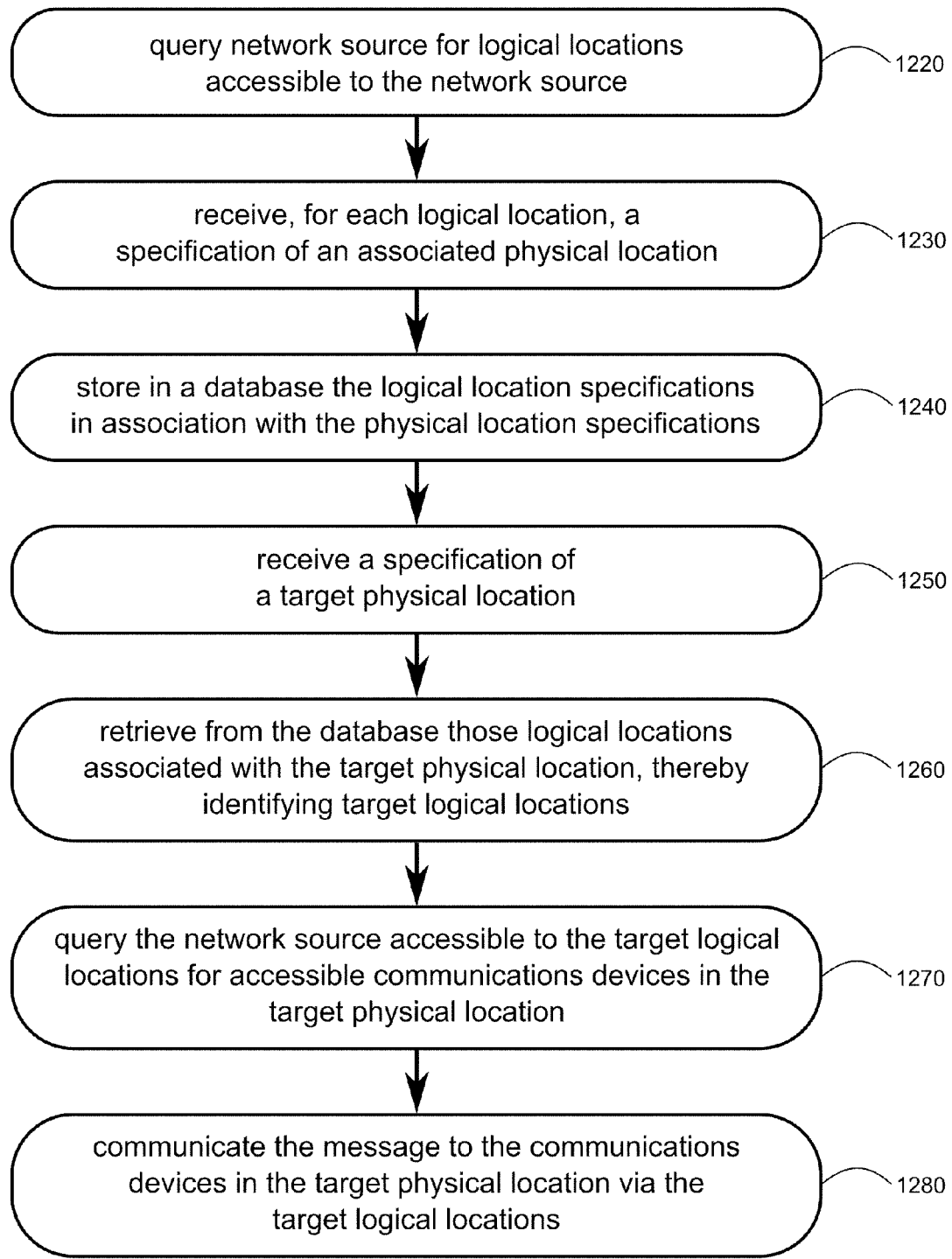
FIG. 12 shows a flow chart illustrating a method of communicating a message to a target communications device in a target physical location, in accordance with the present invention.
Figure 13:
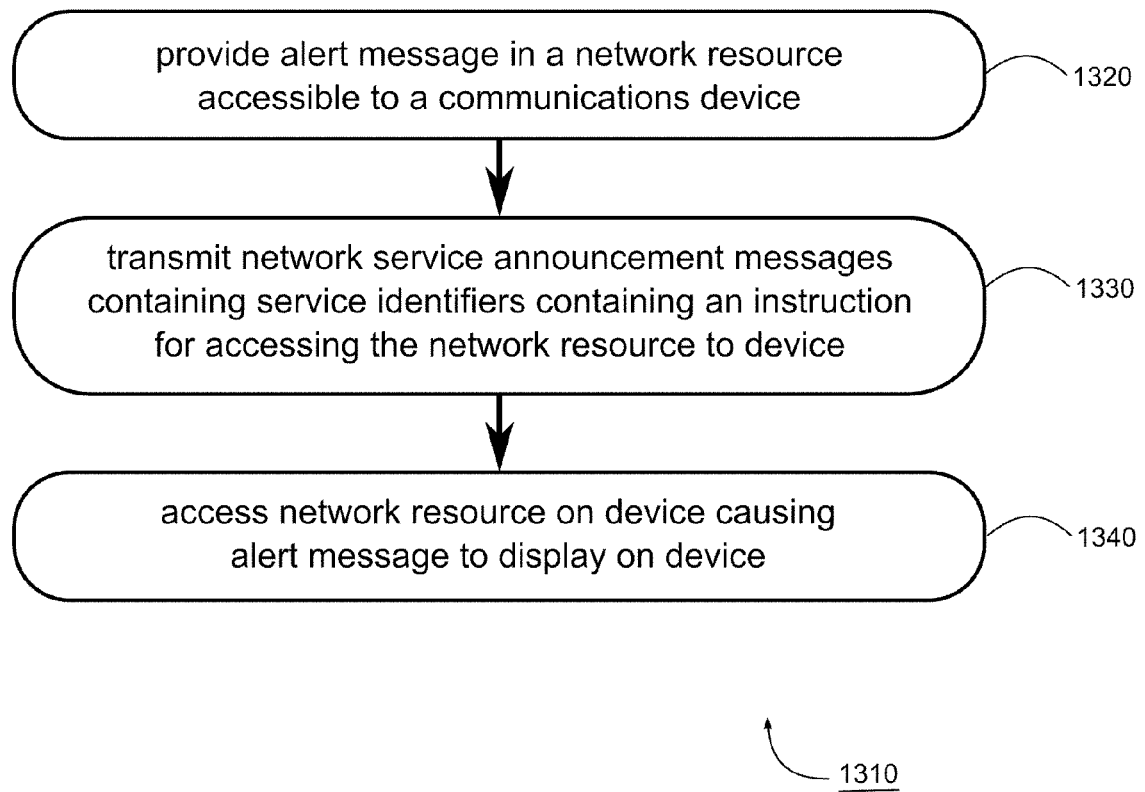
FIG. 13 shows a flow chart illustrating a method of displaying an alert message on a communications device unassociated with a network gateway, in accordance with the present invention.

Additional embodiments of methods according to the invention are shown in FIGS. 12 & 13, and are now described.

FIG. 12 illustrates a method 1210 of communicating a message to a target communications device in a target physical location. First, a network source is queried for logical locations accessible to the network source (step 1220). Next, for each logical location, a specification of a physical location associated with that logical location is received (step 1230). Each logical location specification is stored in a database in association with the associated physical location specification (step 1240). A specification of the target physical location is received, e.g. from the broadcast authority (step 1250). Those logical location specifications associated with the target physical location are retrieved from the database, thereby identifying target logical locations (step 1260). For each target logical location, at least one of the network sources accessible to that logical location is queried for specifications of communications devices accessible to that logical location, thereby identifying the communications devices in the target physical location, the target communications device being one of the communications devices in the target physical location (step 1270). The message is then communicated to the target communications device in the target physical location via at least one of the target logical locations (step 1280).

FIG. 13 illustrates a method 1310 of displaying an alert message on a communications device unassociated with a network gateway. The alert message is provided in a network resource accessible to the communications device (step 1320). At least one network service announcement message is transmitted from the network gateway to the communications device, the announcement message containing at least one service identifier containing an instruction for accessing the network resource (step 1330). The alert message is caused to be displayed on the communications device when the communications device accesses the network resource (step 1340).

Reporting Module

The system 710 may include a reporting module 850 to generate reports based on the contents of the database 740 or based on any other information receivable by the system 710. Such reports may include information regarding the recipients for which an attempt to communicate the alert message was made, the type(s) of each recipient's target device(s) 790, the address(es) of such device(s) 790, and any acknowledgement(s) or response(s) received from the device(s) 790 via the response handler 760 or otherwise, including any two-way communications established and recorded, along with the alert message itself and any associated content. In particular, the content of the alert message including any text, image, or audio may be included in the report to make finding the historical record of the alert message easier for the purposes of any regulatory compliance. Such reports may also include information specifying whether a transmitted alert message has or has not been successfully received by any particular device. Such reports may also particularize linkages between multiple alerts and their responses to provide an incident response audit trail.

Message Authentication/Key Server

The system 710 may include a key server 710 module for providing for the authentication of broadcasted alert messages and for avoiding the creation of additional paths for spam to the target devices 790. Any suitable authentication methodology may be employed, including authentication employing public-private key encryption. In such an embodiment, the dispatch module 720 communicates a request to the key server 750 for a message tag and a private key. The key server 750 then generates a new public-private key pair and associated tag, and communicates the tag and private key to the broadcast module 720.

In preparing the alert message for communication to the target devices 790 via the delivery module 730, the dispatch module 720 encrypts some part of the message package using the private key and then packages the recipients' identifiers (and addresses, as the case may be—see above), the alert message, and the message tag. For example, a timestamp included in the alert message, or any other predetermined portion of the alert message, may be encrypted. The package is then communicated to the delivery module 730 for communication to the target devices 790.

Upon receiving the alert message and message tag, any target device 790 configured to authenticate the alert message (e.g. operating an alert message client application configured for such purpose—see above) may communicate with the key server 750 to retrieve the public key associated with the private key used to encrypt a portion of the alert message. The public key may be retrieved from the key server 750 by means of the message tag (i.e. by communicating the message tag to the key server 750). The target device 790 may then decrypt the encrypted portion of the alert message using the public key to authenticate the alert message. For example, if the encrypted portion of the alert message is a timestamp included therein, then the target device 790 would decrypt such portion using the public key, which may in such case be time-limited. (Limiting the public key to a particular time in such case would serve to avoid illicit re-use if the private key is broken or stolen.) The target device 790, or alert message client operating thereon, may then identify the alert message as authenticate only if the decrypted timestamp falls within a predetermined time/date range. In other words, if the decrypted timestamp is too far in the past, or is instead in the future, then the target device 790, or later message client, may consider such message to be unauthentic. In general, any authentication may be employed by the system and target device such as symmetric key cryptography.

In such an embodiment, the public key server is "well-known" to intended recipients. For example, it may be determined "out-of-band" (pre-configured) so as to avoid illicit originators establishing a shadow key server. Alternatively, all alert message clients may be pre-configured with an address or identity of the public key server. Such address or identity may include a preset, well-known hostname, with the advantage that the public key server could be accessed, e.g. across public networks.

Message authentication, such as described above, will generally only be performed in target devices having an alert message client installed/operating. Since not all target devices will ordinarily be capable of operating such a client (e.g. a simple voice telephone), the bulk of the alert message itself is usually not encrypted. However, in special cases where the dispatcher is sufficiently confident that all intended recipients are, or should be, operating a cooperating alert message client, then any part, including the entirety, or the alert message may be encrypted.

The system 710 may also be configured to perform deception detection in the event than one or more target devices 790 indeed receives a counterfeit alert message. For example, the response handler 710 may be configured to compare the acknowledgement or other response information received from a target device with information stored in the database 740 regarding any recently or previously transmitted alert messages and identify and suspicious inconsistency. For example, if a target device 790 transmits a receipt acknowledgement to the response handler 760, but no alert message has been transmitted recently, then the response handler 760 may flag the acknowledgement and either generate a report via the report module 850 or transmit a message to the dispatch module 720 for, e.g. the dispatcher's consideration.

Any alert message client installed and operating on a target device may also be configured to include in a recipient acknowledgement from the target device a copy of the received alert message; such copy may then be compared by the response handler 760 with a copy of the original alert message stored in the database 740. Such a comparison technique may also be employed where the target device receives an e-mail or SMS/MMS message, and replies to a response mailbox or SMS/MMS shortcode.

Database

As discussed above, the database 740 stores records for each recipient who registered/subscribed to receive alert messages. The database 740 may also store information concerning any other recipient or target device not registered/subscribed to receive alert messages, but whose identity and/or target device address(es) were determined by any of the means discussed above. Such device addresses may include a network address, a telephone number (including a cellular telephone number), a corporate domain user name, a network interface identifier, and so forth. The database also holds the information received by the response handler 760 in order to provide information for the report module 850.

Physical Implementation

The system 710 may be implemented in any combination of hardware and/or software as is considered advantageous and desirable in any particular application. All of the dispatch module 720, the response module 730, the database 740, the key server module 750, the response handler 760, and the report module 850 may reside and operate in a single computer or may reside and operate in any plurality of computers interfaced to each other. In addition, any of the functionality of the various models may be embodied in computer software instructions residing in a memory or a computer-readable medium in communication with a computer, or may alternatively be embodied in special-purpose hardware specifically constructed to perform such functionality. Any of the various interfaces between the various modules and components illustrated in FIGS. 7 to 10 may be embodied as logical connections between software components or constructs, or may instead be embodied as a physical communication means (e.g. a physical network connection or other data connection such as a data connection to a DTMF dialer). In general, a person skilled in the relevant art may implement the logical functionality of the various parts of the systems illustrated in FIGS. 7 to 10 and described herein to suit any particular application.

Specific Embodiment Employing an Agent Framework

The above-described system may be implemented in any specific hardware/software configuration considered to be most advantageous in any particular context. For example, the system may be embodied in a system such as that described in the Applicant's co-pending International Application No. PCT/CA2007/002197. The details of such specific embodiment now follow. For the purposes of distinguishing and/or describing relationships between the general embodiment previously described and the specific embodiment now described, the embodiments will hereinafter be respectively termed "general system" or "general embodiment" on the one hand, and "system" or "present embodiment", on the other hand.

The present embodiment now described contemplates the provision of alert message broadcasting, as described above, as part of a system also generally directed to providing broader communications services to end users. The inclusion of alert message broadcasting in such a system is particularly advantageous inasmuch as it provides an integration, and therefore simplification, of the communications services needed and/or desired by an end user.

Specifically, the system enables end users to retrieve messages and other selected content from a plurality of sources and for the processing of such messages or other content for the intelligent miniaturization or other tailoring thereof for the user's mobile device or a set of designated delegates' mobile devices, and the forwarding of the processed content to the device(s). Such content may include: passive content—e.g., extracted from messages and informational in nature); or active content—e.g., also extracted from messages, which the user can use to trigger actions such as making a call, starting a chat, ordering payment for a service or product, etc.

The system further provides for the prioritized broadcast of alert messages to selected groups of users and their devices. User profiles are maintained variously in databases, directories, and other communications nodes (as in the general embodiment). These sources are queried for the identification of selectable groups, which are then presented to the system administrator (e.g. the dispatcher) for choosing the recipients. The alert message is provided to broadcast agents within an agent framework which then generate pooled agents specific to each target device type to deliver the message using appropriate messaging channels. The broadcast response agents then watch for and collect responses for later reporting.

Of particular advantage is that the system is adaptable to retrieve messages from any source that is accessible by the system via a network including, but not limited to, the Internet. Such sources include Internet mail transfer agents ("MTAs") and SMS gateways, external and internal mail servers, including RSS feeds, native Web pages, databases, Web and Internet services.

The system provides for the maintenance of a profile for each user, wherein such profile influences the collection, processing, and forwarding of messages and other content to the user's device. The system contemplates multiple user levels wherein such parameters as message box polling frequency, message processing priority, and system resource allocation are influenced by a user's level. In at least one embodiment, the user's profile is accessible, at least in part, by the user to allow him or her to directly select preferences regarding: mailboxes or other sources for content retrieval; the manner in which such content is processed, miniaturized, or otherwise tailored for presentation on the user's device(s); and the devices to which such processed content is to be forwarded while mobile.

The system provides for the maintenance of profiles for closed user groups which influence the processing, context analysis, and forwarding of messages and other content to the devices of the users in such groups.

For accomplishing the above-described functions, the system includes a collaborative, multi-Agent Framework in which interdependent, but essentially autonomous, user-configurable agents perform many of the functions. The Framework interfaces and cooperates with components internal and external to the system, as described hereinafter. A Service providing network-accessible content or services to mobile devices is implemented as an application in the Agent Framework. This Service leverages the Framework to provide a scalable capability for registered end-users to self-manage which specific content reaches their mobile device, including the form in which it is transmitted.

The scalable multi-Agent Framework supports hundreds, thousands, or millions of users through the integration of an intelligent scheduling agent, a database connection agent, and framework support for agent pools containing variable numbers of agents to performing processing tasks. Agents are built on this framework to provide for connecting to content sources (e.g. mailboxes or servers), for applying context-based user preferences with respect to filtering and processing content, for transmitting notifications or alerts to the devices, for triggering Internet services based on active content, and for monitoring problems that may require user intervention.

The system also enables mobile users to respond to notifications through the use of messaging channels back to the Agent Framework from the mobile device. These channels include electronic messaging, SMS, instant messaging, direct IP connections, voice channels, or web browsing. In some cases, responses to notifications can be improved through the use of mobile client-based agents known by the framework. A user might, for example, want to send a "canned" response to the sender, or might want to receive the full text of a message in multiple subsequent messages if the original notification included only a small summary. The system also enables mobile users to respond to notifications through the use of active content provided within the notification. Such active content is used to enable communication methods native to the devices, such as the initiation of voice calls or chat sessions on a mobile phone. Active content may also trigger transactional services such as payment for a product or service by a user through a proxy agent with authorization from the user to perform such payment.

System Components

FIG. 1 shows a schematic diagram illustrating an exemplary system 10 according to the present embodiment. The system 10 includes one or more servers 20 running operating systems within which the Agent Framework 30, the Watch Dog 40, and the Web Application Server 50 operate. An Administration Console 60, an end-user Self Administration Portal 70, and a Reply Handler 75 operate within one or more of the Web Application Servers 50. A Database 80 for capturing and storing all user data runs on another server or cluster of servers. Also included are scripts 90 for performing administrative tasks as described hereinafter.

The system 10 interacts with HTTP clients 100 (e.g. web browsers operated by end users on fixed and/or mobile devices) via a Self Administration Portal 70, whereby the end users can view and modify their profile and status as stored in the Database 80. It also interacts via HTTP (fixed and/or mobile) with administrator users via an Administration Console 60, whereby administrators can monitor and configure the Service profile in the Database 80, the Agent Framework 30, and the Watch Dog 40. As described hereinafter, the Administration Console 60 also employs a Management Adapter 65 to interface the Agent Framework 30.

The system 10 also interacts with sources of passive content (corporate directory servers, mail stores and information services 110, and Internet mail stores and information sources 120) and active content (e.g. Internet services brokers that deliver a service or product to end users after electronic payment) via both standard and proprietary protocols to retrieve new or updated content. Finally, it also interacts with gateways via standard protocols like SMTP, SMPP and SOAP, and interacts with any other provided communications interfaces 125 (e.g. local networking equipment providing access to communications networks, voice telephony equipment) to provide communication to both mobile and fixed end-user devices. Included are an SMTP Gateway 130 which is used to communicate with external SMTP mail transfer agents ("MTAs") 140 for accessing external message sources, and external Service Provider SMS/MMS Gateways 150 (which may include e-mail-to-SMS/MMS Gateways) for interfacing with mobile devices via the SMS/MMS protocol.

In performing its alert broadcasting functionality, the external sources or recipients accessible by the system, identified above, may be included in any of the sources or recipients described in connection with the general system. For example, the Directories 127 may include the corporate directory servers identified above, as well as any other directories 780 as described in connection with the general system. Likewise, the communications interfaces 125 may be included in any of the communications nodes/network sources 770 or the network gateway 870 in connection with the general system. Similarly, the SMTP Gateway 130 and/or SMTP MTAs 140 may be included in the SMTP MTA or gateway 840 of the general system.

The Agent Framework 30 is run within a secure environment (e.g. a Java Virtual Machine) and is itself generally implemented as a closed, secure system, but the typical operating environment is in a server 20 behind a secure network firewall 160. It is not reliant upon any specific firewall functionality, but a typical installation will ensure blocking of all access ports except for those required by HTTP, SMTP, POP3 and IMAP, and their encrypted variants.

The Agent Framework 30 provides an environment for application development in the form of collaborating agents. Capabilities include: instantiation, management, and destruction of agents, support for the management of pools of cloned worker agents, inter-agent communication, timer management, and logging.

The management components external to the Agent Framework 30 include two web applications running in a Web Application Server 50. The first is an end-user accessed Self-Administration Portal 70, whereby users subscribe to the Service and manage their profile. This component interacts only with the Database 80. The second is an Administration Console 60 provided for administrators to manage the system. The Administration Console 60 leverages two additional components: a Watch Dog daemon 40, which starts, stops, and ensures robustness of the Agent Framework 30 and the Service; and a Management Adapter 65, which provides a real-time interface into the Service. The Management Adapter 65 in turn communicates with a Management Agent within the Agent Framework 30 in order to retrieve real-time status from agents that make up the Service. Additionally, external to the Agent Framework 30, periodic scripts 90 are run to maintain the Database 80 and to provide additional reporting functionality, such as providing periodic updates to users of the Service's activity regarding their own profiles.

The Service can be deployed either as an enterprise application (i.e. providing services to a group of users authenticated against local corporate domains) or as a service-provider managed or hosted application (i.e. providing services to external subscribers that are not members of a cohesive authentication domain). In the case of a corporate deployment, end-users are authenticated for self-management using domain authentication against a directory service. In a service-provider deployment, the Service provides internal authentication and password management. Other than this difference, the Service components are indifferent to the deployment scenario.

In both enterprise and service provider deployments, the system may consist of multiple Agent Frameworks 30 each controlled by a Watch Dog 40 and interfaced with a Management Adapter 65. Each such Agent Framework 30 is identified by a Service ID, and each subscriber is assigned to one Service ID, but may be moved from one Service ID to another to allow for load balancing between different instantiations. Such distributed Frameworks each operate independently, but share the User Database 80, the associated scripts 90, the Self-Administration Portal 70, and the Administration Console 60. In general, however, all of the Agent Framework 30, Watch Dog 40, Administration Console 60, Management Adapter 65, Self-Administration Portal 70, Database 80, and scripts 90 components can be combined into a single server or split into a multiple server solution. In a multiple server scenario, the Agent Framework 30 and Watch Dog 40 components are generally co-located, and may be duplicated for scalability and/or redundancy purposes. Likewise, in cases where the Database 80 is distributed across multiple servers, each such segment or portion will generally be accompanied by scripts 90 for the maintenance of that portion or segment. Multiple Web Application Servers 50 may also be provided with each operating a corresponding Administration Console 60 and/or Self-Administration Portal 70. The end-user Self-Administration Portal 70 and the Administration Console 60 are both constructed to recognize and interact with multiple Framework/Watch Dog combinations.

The management components of the system and the Agent Framework will now be described, followed by a description of components of the Service and its operation.

Service Administration Console Components

The Administration Console 60 provides an interface for administrators to monitor and manage the Service, and to generate alert messages for broadcast (i.e. as a dispatcher in the general system). The Console 60 is a web application that can support multiple instances of the Agent-Framework/Watch-Dog/Management-Adapter environments, which the administrators access by specifying the Service ID.

The Administration Console 60 interfaces locally or across a network with the Management Adapter 65 for access to real-time status information about the Agent Framework 30, for access to agent configuration files, for access to the Watch Dog 40 interface, and for access to utilities that provide local processing of longer commands (such as broadcasting a message to all subscribers on a specific Service ID).

The Console 60 also interfaces directly with the User Database 80 for allowing administrators to monitor and modify subscriber account data and processing results.

In performing the alert broadcasting functionality of the system 10, the Console 60 may further interface for querying the User Database 80 (to retrieve, e.g. user group attributes such as wireless service provider, e-mail provider) and/or Communications Interfaces 125 (e.g. WiFi controller/switch) and Directories 127 (e.g. to retrieve distribution lists, location names) via the Management Adapter 65 and Agent Framework 30 (as described further hereinbelow) for obtaining information regarding prospective alert broadcast recipients. The Console 60 further interfaces the Agent Framework 30, via the Management Adapter 65, for creating the alert message to be broadcast, and for initiating broadcast of the alert by passing a "broadcast package" containing the message to corresponding agents in the Agent Framework 30, as described hereinafter.

In particular, the Console 60 may be employed to select or otherwise affect the system's 10 operational priority with respect to its handling of alert message broadcasts. As described herein, the system 10 may also include and perform general user content and forwarding functionality, and as is described hereinbelow the operational priorities of such functionality may be determined by user classes of service and other scheduling parameters. In performing alert broadcasting, a dispatcher using the Console 60 may assign the alert broadcasting task any desired priority to override such scheduling in order to ensure the expedited delivery of an alert broadcast. Alternatively, the system 10 may be preconfigured to give alert broadcasts the highest priority, i.e. to perform them first in preference to the general user content retrieval and delivery functions of the system 10.

In addition, where the system 10 is provided with functionality for auto-discovery of selectable target locations, and auto-discovery of target devices within a selected location, the Console 60 may provide means for managing these processes, selecting the target location(s), for formulating and providing the alert message to be broadcast, and for receiving any information from the system such as response reports or sensor notifications, as described above.

The system 10 may include or provide via the Console 60 a set of templates or other tools to enable or assist a dispatcher to construct an alert message for broadcast using the system 10. The templates or tools may variously correspond with particular target user devices such that, by using such a corresponding template or tool, the content of the alert message will be receivable and displayable/perform-able by that device. For example, one template may limit the alert message to text of a maximum number of characters to ensure that it is receivable and displayable by devices capable of receiving SMS messages. Alternatively, the system 10 may employ a Content Personalization Agent 295, as described hereinafter, to 'tailor' whatever alert message is prepared and forwarded by the Console 60 to the Agent Framework 30 so as to be receivable and displayable/performable by any particular target user device.

The report 850 functionality of the general system 710 may also be implemented in the Administration Console 60 or as an agent in the Agent Framework 30 configured for such purpose.

Service Self-Administration Portal Component

The Self-Administration Portal 70 is a web application accessible via fixed or mobile HTTP clients that provides subscribers with a way to personalize the Service capabilities to match the content sources that are important to them, and to format that content for their particular devices. The portal is independent of specific Service IDs, and interacts only with the User Database 80 for reading User Data and storing back any modifications. Subscribers have no need to know the specific Service ID their account is being processed on.

Subscriber authentication to the portal leverages directory services where they exist, such as in an enterprise deployment or an LDAP-enabled Service Provider environment. In such cases, the subscriber's domain, user name, and password are used not only to authenticate to the Portal, but also to access the prime content source (usually an enterprise mailbox).

Once authenticated, subscribers are presented with a user interface that allows them to see the status of the Service's access to each of their content sources, including any persistent error state, the time of the last content forwarded, the number of content messages forwarded, and other statistics. They can also add/remove content sources, can modify their mobile devices, and can modify the forwarding and formatting personalization settings.

The Self-Administration Portal 70 also supports self-subscription, if enabled by the deployment scenario (i.e. if the Directory Retrieval Agent 570 (described hereinafter) is disabled). In this circumstance, a subscriber can access the Portal 70 anonymously and can fill out a registration form that requires identification of a prime content source (usually an enterprise mailbox) and one destination device.

The Self-Administration Portal 70 further enables a subscriber to subscribe to, and to specify any parameters regarding, an alert broadcasting service of the system 10. For example, a subscriber may specify particular devices at which the subscriber wishes to receive alerts, or to provide any other specification or selection usable by the system in selecting the subscriber as a recipient of an alert broadcast and dispatching an alert message to the subscriber's device(s).

Script Components

Several scripts (or small utility programs) are run periodically by the system in order to maintain the User Database 80 and to provide other administration duties. These scripts include the capabilities for:

changing the Service Level Agreement of users whose paid interval is over (e.g. change paid to free);

adding and deleting users (batch subscriptions only: single users are processed in real-time);

validating users from an external e-commerce system (in a Service Provider environment);

backing up the database;

trimming the reporting-related data (transactions) from the database; and sending unsolicited messages, for example:

to free subscribers: e.g. advertisements for the paid service;

to all subscribers: e.g. status messages indicating the processing and notifications performed by the Service for them over the past week or month;

to targeted subscribers: advertisements for 3rd parties;

to expiring subscribers: warning that their paid service is about to expire and that user will be downgraded to the free service; and to welcome new users.

Collaborative Agent Framework

Figure 2:
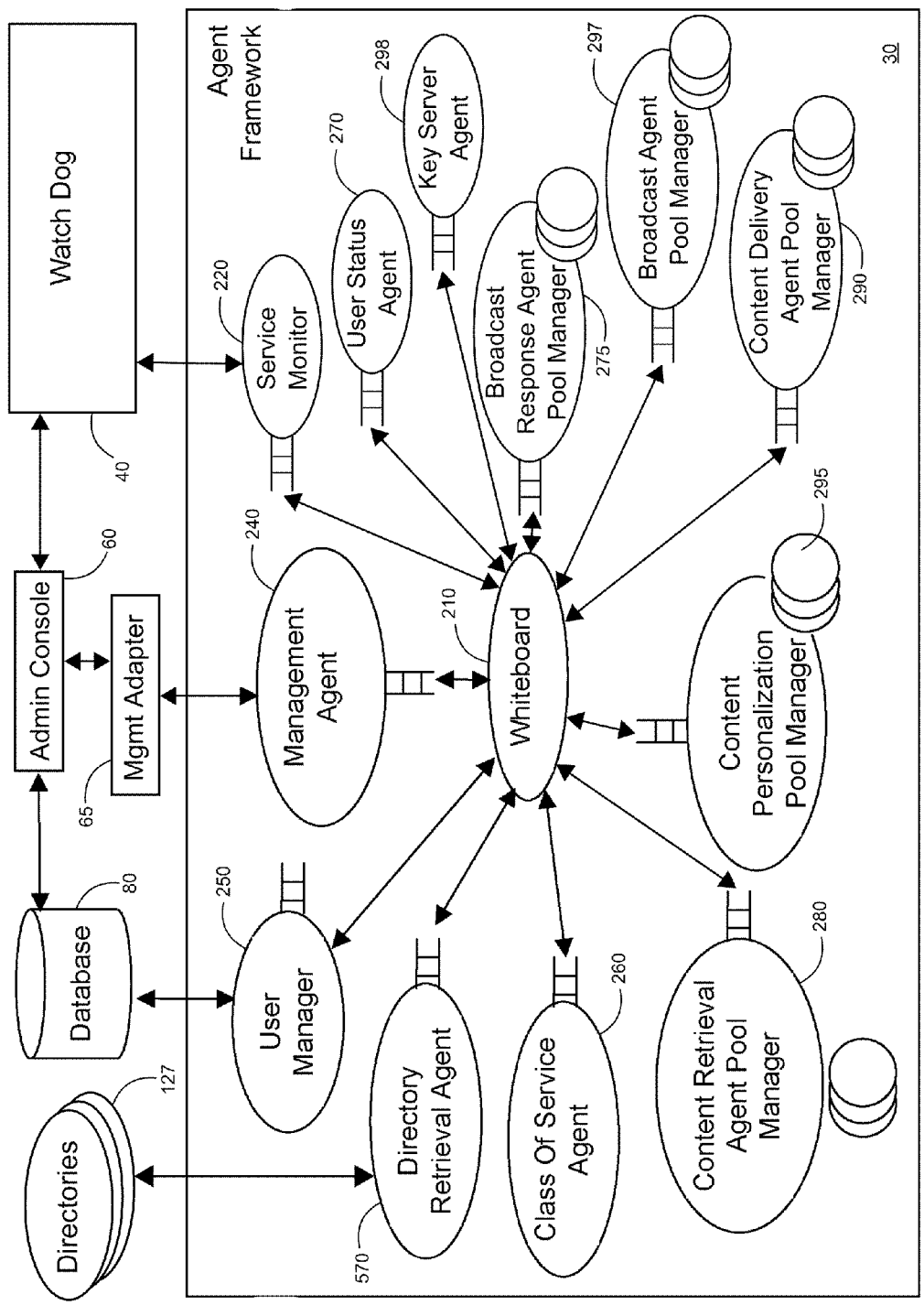
FIG. 2 shows a schematic diagram illustrating components of the agent framework of the system illustrated in FIG. 1.

FIG. 2 shows a schematic diagram illustrating components of the Agent Framework 30, agents of the Service operating in the Framework 30, and several of the system components external to the Framework which have already been introduced. The Framework 30 supports two forms of agents: singleton agents and pooled agents. Any function requiring an agent may be performed by a singleton agent; however, in the exemplary system, pooled agents (described further hereinafter) are ordinarily used for performing Service functions that can be scaled through multiple concurrent activities, and singleton agents typically provide application control or access to and management of constrained resources (such as the pooled agents).

Figure 3:
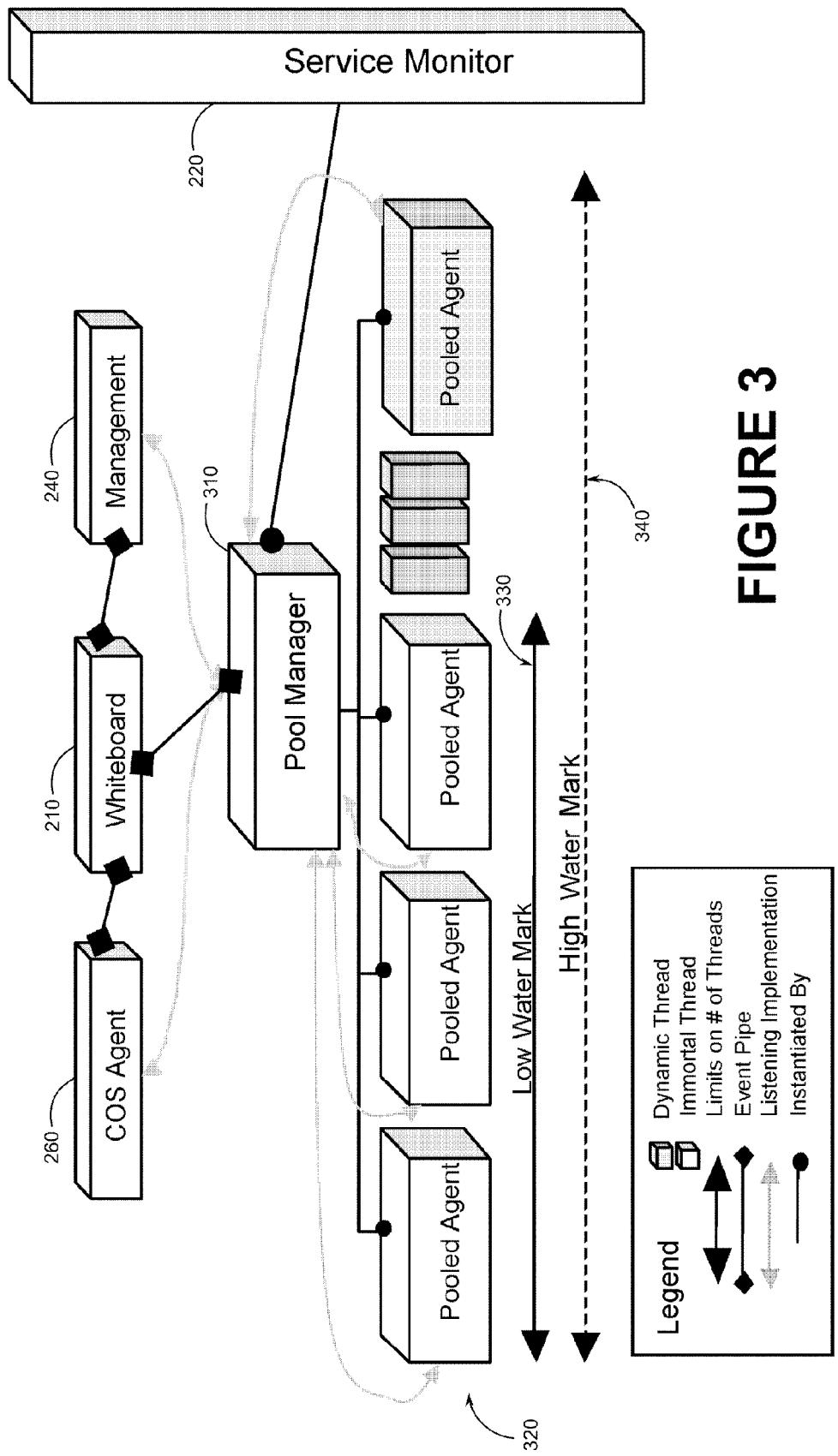
FIG. 3 shows a schematic diagram illustrating an agent pool management framework employed by the agent framework illustrated in FIG. 2.

Singleton agents providing control over pooled agents make use of the pool management facilities of the Framework which support creation, distribution of work, sanity checking, destruction, and reincarnation (i.e. reactivation when excessively delayed in delivering a result) of the pooled agents. The Framework 30 provides the ability to manage performance and scalability by means of agent pool management. With reference to FIG. 3, the Pool Manager 310 manipulates the number of threads provided by an agent for doing work. The role of the Pool Manager 310 is to act like a bridge by allowing a pool of agents 320 to take the place of a single agent, while maintaining the same interface as the single agent. It manages the delegation of received events to the pooled agents 320, and responds to the replaced agent's events normally. Such events are processed in parallel through the pool of agents.

The Pool Manager 310 has operating parameters that place limits on the number of agents within a pool. The minimum number of agents (i.e. the 'low water mark' 330) are automatically instantiated upon pool initialization. The Pool Manager 310 can then create more agents as needed to manage incoming requests, subject to the limitation of the maximum number of agents (i.e. the 'high water mark' 340). In the description and Figures, reference may be made alternatively to a 'poolable agent' or to a pool manager of such agents, but it will be appreciated that either reference includes either alternative.

With reference again to FIG. 2, the Agent Framework 30 provides a Whiteboard 210 messaging system for agent interaction. The Agent Framework 30 also provides timer management facilities supporting the creation and destruction of timers, as well as the handling of timeouts. It also provides logging facilities for hooking the Service into the logging mechanism of the host operating system. Finally, the Framework 30 provides a mechanism for receiving startup, graceful shutdown, immediate shutdown, and sanity check commands from an external entity (e.g. the Watch Dog 40).

Applications running within the Agent Framework 30 are developed using the defined interfaces of the Framework, which require the applications to implement known interfaces for initialization, destruction, and sanity checks. The Service agents integrate into the Framework through either pre-configuration of the Service Monitor Agent 220 or via external injection from the Watch Dog 40. The Service Monitor Agent 220 handles the starting, stopping, and sanity-checking of the Service agents at the request of the Watch Dog 40. The Service agents leverage the Whiteboard 210 interfaces for communications, timers, pool management, and logging.

Agents implemented using the Agent Framework 30 are architected to be event-driven, waiting to receive events (messages and timer events), processing each one to completion, then waiting for the next event. Agents typically keep any persistent configuration data in property files (flat files). When the agent is launched it initialises all of its configuration values from its persistent storage, and then reports that it is ready to start processing events. When it receives a shutdown event it will write any new configuration data to the persistent storage before shutting down.

It is to be understood that the foregoing description of agents and the Agent Framework 30 is also characteristic of the agent platforms 915, 920 illustrated in FIGS. 9 & 10 in the embodiments illustrated therein.

The Framework components will now be discussed in greater detail.

Framework Whiteboard

The Whiteboard 210 is the messaging service for providing messaging between the agents. Events are sent to the Whiteboard 210 from any agent and forwarded to the queues of any agents that have registered to receive such events. Receiving agents process the notifications in order, to completion, as part of their event loop. This mechanism allows agents to post specific rich content message events and to request notification of the posting of specific events. For example, a worker agent that has completed work could post a Content-Retrieval Complete message, and any waiting application agents would receive the message.

Multiple queues are provided for each agent to support messages of differing priorities, with the number defined by the application's requirements. The agent is given only a single interface to the queues: the Whiteboard 210 ensures that higher-priority events are handled before lower-priority messages.

The Whiteboard 210 is also capable of moving message queues between agent instances. This is done automatically when the Service Monitor Agent (SMA) 220 deems an agent "insane", as described below. After a new clone of the agent is created, the Whiteboard is directed to give the original's incoming message queue to the new agent.

Framework Management

The Agent Framework 30 provides a Service Monitor Agent (SMA) 220 for application management. It provides the start-up, status, and shutdown access point for the agents within the Agent Framework 30. Agents are created variously through SMA 220 configuration properties, through Watch Dog 40 injection to the SMA 220 (where the path to the agent software is identified), or by hard-coding into the SMA 220 start-up list. At Framework start-up, the SMA 220 listens for a connection from the Watch Dog 40 for controlling the service, and, once connected, responds to Watch Dog 40 commands to start, stop, and poll the agents.

Figure 4:
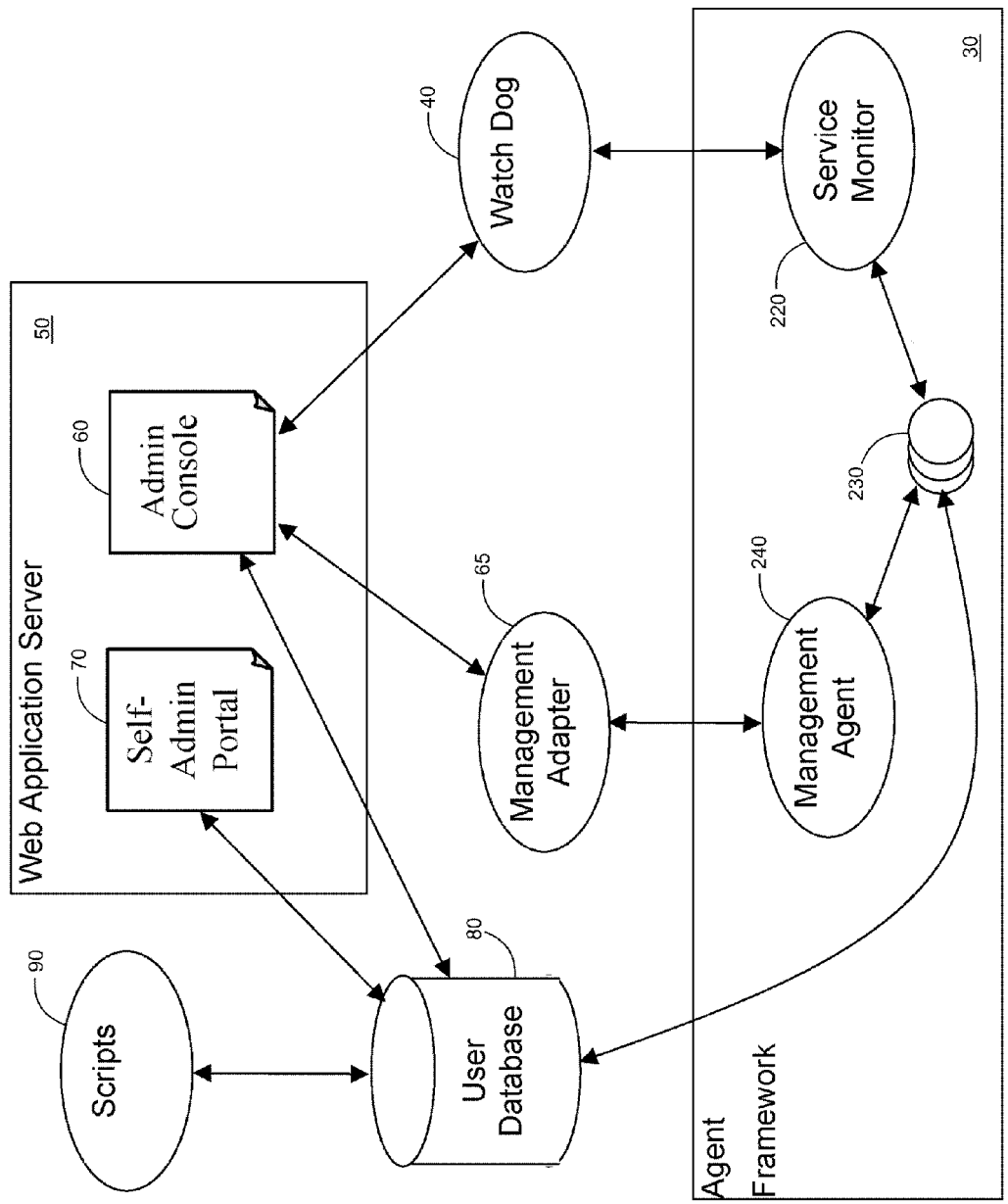
FIG. 4 shows a schematic diagram illustrating a subset of the agents and system components involved in management of the agent framework illustrated in FIG. 2.

With reference to FIG. 3 and FIG. 4, the latter showing a subset of the agents and system components involved in Framework management, the SMA 220 polls the manageable agents 230 (representing any of the Service agents shown in FIG. 2) at the request of the Watch Dog 40 to determine if they are all still alive and able to process events. If a persistent unrecoverable agent failure is detected, the SMA 220 will initiate a service shutdown and report this event back to the Watch Dog 40. When commanded, the SMA 220 initiates a shutdown by asking each agent 230 to shut down (on its high priority message queue), and awaits their responses. Any agents 230 not responding within a configured time are killed. Data may be lost if shutdown is not controlled and the agent 230 has to be terminated.

If a single agent is deemed insane, the Whiteboard 210 will hold messages for such agent until the new instance is up and running. A new instance of the agent will be created and initialized. The new agent's queue will be populated with the messages retrieved from the dying agent via the Whiteboard 210.

Framework Timer Management

The Framework 30 provides agents with the capability to start, stop, and handle interrupts from timers, generally used to provide periodic services and to recover from networking problems. A timer management facility of the Framework allows a client agent to create any number of timers, which can be single shot (one timeout), or repetitive (start again after the first timeout). When a timer expires, it calls back to an interface that the agent provides to the timer management facility. To improve CPU use efficiency, the agent specifies the lowest resolution of timer that is desired (the "tick length"). The timer management facility can thereby minimize processing at each of the system-level timer interrupts, allowing for efficient high and low resolution timers.

Framework Logging

The Framework provides agents with a logging facility for logging activity to mechanisms on the local operating system, or to a central server if multiple Service IDs are in use. It supports run-time determination of the logging method, and offers a factory-based instantiation model, where agents can create their own log headers in order to clearly identify the originator of each log. Additionally, logs from several Agent Frameworks can be combined and centrally located if necessary.

Watch Dog Component

Operating as a persistent "daemon" within each collaborating server, the Watch Dog 40 is started and stopped under administrator control and automatically restarted in the occurrence of a server reboot. The Watch Dog 40 ensures robustness of the Service by maintaining a connection to a corresponding Service Monitor Agent 220 operating within the Agent Framework 30, offering recovery from problems with the Agent Framework 30 that were unforeseen, such as unexpected message formats and/or networking problems that could cause the system to slow down or run out of memory.

At a tunable frequency, the Watch Dog 40 requests a sanity check from the Framework, which returns a status of e.g. red/yellow/green. Agent Framework 30 applications determine what constitutes a yellow or red condition themselves, responding to the Service Monitor Agent 220 which in turn responds to the Watch Dog 40 with a rollup of the individual application states. The Watch Dog 40 responds to the rollup states by restarting the Agent Framework 30 if a red status is returned, or in the case of a configurable number of repeated yellow states. It also treats non-response as a red status, forcing a restart of the Agent Framework 30.

In addition, the Watch Dog 40 produces alerts to inform administrators of automated problem recovery and when administrator assistance is necessary. The Watch Dog 40 further provides a console interface for manually starting/stopping/restarting the service and checking its status, although typically administrators interact with the Watch Dog 40 via an application-specific administration console.

Service Management Agent

The Management Agent (MA) 240 is responsible for managing all real-time management queries from the Management Adapter 65 component (i.e. from the Administration Console 60). It can request that all manageable agents report their status, and can push information to a specific agent for tweaking settings while the system is live. It also listens for critical system errors such as SMTP connection failure, and informs the Management Adapter 65 for administrator notification when such a failure occurs.

The Management Agent 240 further processes alert broadcast information received from the Administration Console 60 via the Management Adapter 65. Specifically, as described in connection with the general embodiment, the Management Agent 240 may receive an alert message package including an alert message for communication to intended recipients, and information identifying such recipients which may also include addresses of the communications device(s) of such recipients. The Management Agent 240 may then communicate, via the Whiteboard 210, with other agents in the Agent Framework 30 for obtaining further target device addresses, as needed, for processing the alert message for particular types of target devices, for communicating the processed alert messages to the target devices, and for receiving and processing responses received from such target devices or otherwise.

Service Application Overview

With reference again to FIG. 2, the Service Application includes a Mobile Network Content Service application operating in the Agent Framework 30 consisting of a set of collaborating agent types: Management Agents (MAs) 240, User Management Agents (UMAs) 250, Class of Service Agents (CSAs) 260, User Status Agents (USAs) 270, Broadcast Response Agents (BRAs) 275, Content Retrieval Agents (CRAB) 280, Content Delivery Agents (CDAs) 290, Content Personalization Agents (CPAs) 295, and Broadcast Agents (BAs) 297. (The latter four are shown as corresponding pool managers; as discussed above, these agents are preferably pool-able agents for managing performance and scalability.) Also included are Key Server Agents (KSAs) 298, as described hereinbelow. As described hereinafter, these agents collaborate to provide real-time broadcasting of alert messages to a plurality of diverse user devices.

They also collaborate to provide subscribed users with network-accessible content of interest on their mobile devices in device-appropriate format in near-real-time.

The Service may be used to broadcast an alert message to a plurality of mobile or fixed devices. As in the rendered content case, discussed below, the Service may employ any device-appropriate formatting. The Service forwards these broadcast alert messages in real-time, initiating the broadcast immediately upon reception of the message.

Figure 11:
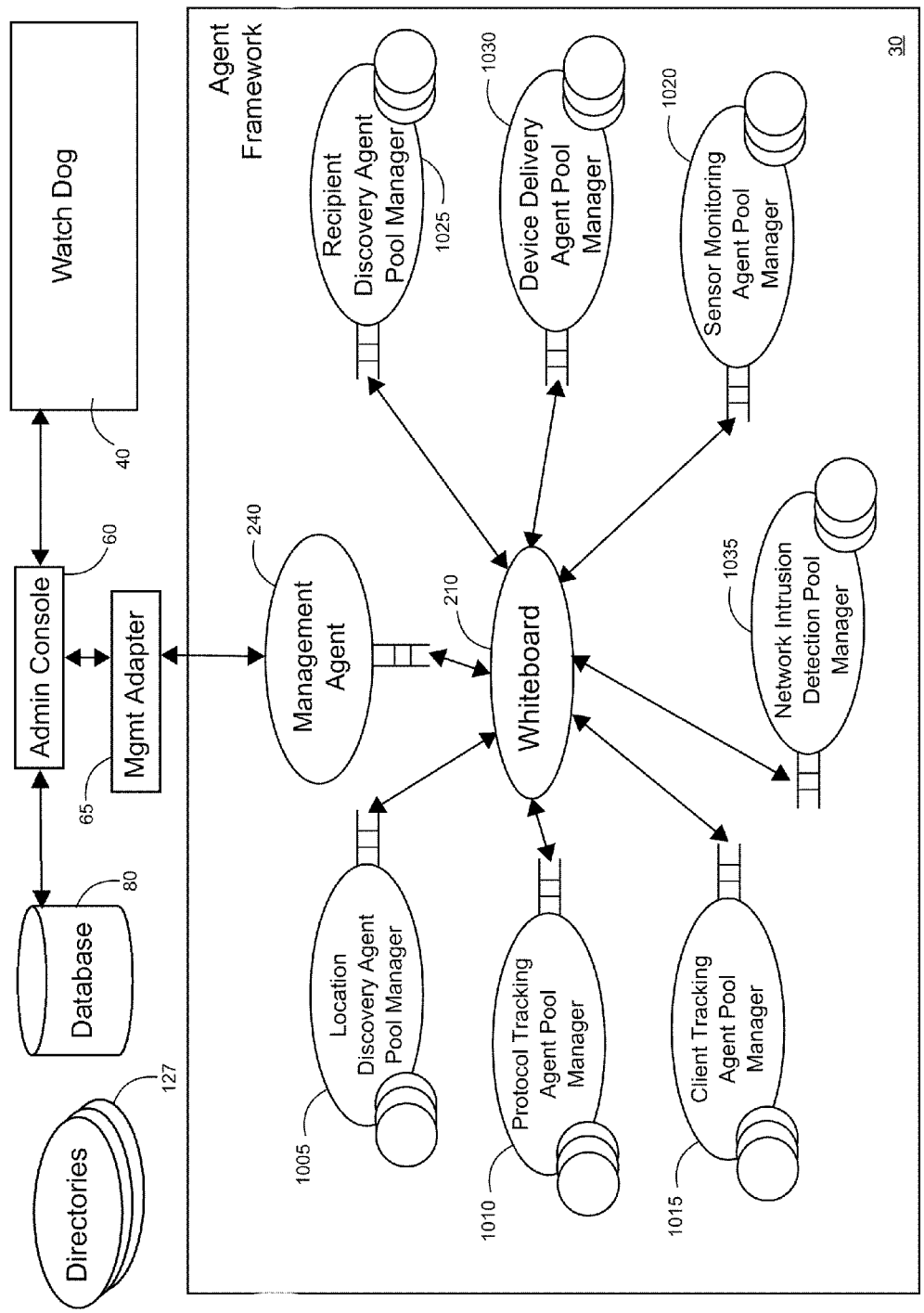
FIG. 11 shows a schematic diagram illustrating further components of the agent framework of the system illustrated in FIG. 1 which provides alert message broadcasting to a plurality of different target device types including auto-discovery of selectable target locations and recipient devices.

Furthermore, where the system provides auto-discovery of selectable target locations for alert broadcasting, auto-discovery of target devices in a selected location, and sensor alert monitoring, the Service Application may further include additional agents and/or agent pools and associated pool managers for providing such functionality, as described above, and as illustrated in FIG. 11 including location discovery agents 1005, protocol tracking agents 1010, client tracking agents 1015, sensor monitoring agents 1020, and recipient discovery agents 1025. Where each or any of these represents a plurality of agents managed by a pool manager, the provision of the plurality of agents may be for the purposes of dividing workload across a plurality of processes/threads; or, as with, for example, the Content Retrieval Agents 280, Content Delivery Agents 290, Content Personalization Agents 295, and Broadcast Agents 297, further described below, each of the plurality of agents may also represent a specialized agent for, e.g. querying a specific type of network source for targetable locations (in the case of the location discovery agents 1005), for monitoring a specific type of network traffic (in the case of the protocol tracking agents 1010), for communicating tracking information with a particular type of target device client (in the case of the client tracking agents 1015), or for communicating monitoring information with a particular type of sensor (in the case of sensor monitoring agents 1020).

As illustrated in FIG. 2, the functionality for handling alert broadcast responses may be provided by a plurality of Broadcast Response Agents 275 or, alternatively, may be provided by a non-agent module such as the Reply Handler 75 as shown in FIG. 1.

Alternatively, the functionality for handling such responses in connection particularly with alert messages sent to target devices having clients for such purpose (see above) may be provided by the client tracking agents 1015 as part of or as an extension of their usual function.

Similarly, as illustrated in FIG. 2, the functionality for communicating alert messages to the target devices may be embodied in the Broadcast Agents 297 themselves, in the Content Delivery Agents 290, possible as instantiated by the Broadcast Agents 297, or by further device delivery agents 1030 specifically provided for the alert broadcast function of the system in cooperation with the Broadcast Agents 297, with at least one of each such device delivery agent specialized according to each type of target device and communications means.

Where the system provides a network intrusion detection functionality, as described above, the Service Application may further include network intrusion detection agents 1035 which may cooperate, via the Whiteboard 210, with the protocol tracking agents 1010, location discovery agents 1005, recipient discovery agents 1025, and/or any of the other agents for providing the network monitoring and intrusion detection functionality described above.

The Service may further be used to forward to a mobile device any content accessible by the server on which the Service agents reside. Examples are: e-mail from mail store mailboxes; blog content from RSS feeds (or other methods); web content from WAP or HTTP access (or other methods); active Internet content requiring user response or authorization, e.g. for payment for a service or product; textual data from database queries or Service-Oriented Architecture (SOA) queries (or other methods); and documents, document text and images from file servers and document repositories. Content is deemed 'of interest' if it meets any of the subscriber's configured preferences, which involves filtering against metadata from the content. Examples are the content originator or a phrase included in an 'allow list' and not in a 'block list', or if the content appears within a specific timeframe, or the content is of a specific format (e.g. a voice message).

In rendering content for forwarding to a mobile device, the Service may employ any device-appropriate format including anything from the subject of an e-mail or the title of a blog post to a full word-processing document to a voice or video message, depending upon the capabilities of the mobile device (e.g. screen size, on-board applications, communication channels) and the preferences of the subscriber. Since mobile devices generally provide a subset of desktop capabilities, a summary, snapshot, or lower-resolution rendering of the content is usually the preferred format.

The Service preferably forwards content in 'near-real-time', meaning that the Service is polling the content sources configured by the subscriber at the rate given in a Service Level Agreement (SLA, described hereinafter), normally on the scale of minutes. When new content is detected on any of the configured content sources, it is processed according to the subscriber's preferences and, if warranted, it is forwarded in the appropriate form to the subscriber's mobile device.

In addition to polling, the Service supports subscriber forwarding of content, for example to process e-mail arriving in a mailbox that is not accessible by POP3 or IMAP protocols, or to process alerts from a solution that does not provide programmatic access. All such content arrives in a 'forwarding mailbox', one for each Service Level Agreement level, which is then polled regularly for new content. There is also a Service-wide 'error mailbox' provided to catch messaging bounces and other problems from devices that are reached via SMTP. This mailbox is also regularly polled, and any parseable errors are automatically processed and added to the affected subscribers' Database records for later problem notification treatment.

The Service components will now be described in greater detail.

Service Class-of-Service Agent

Figure 5:
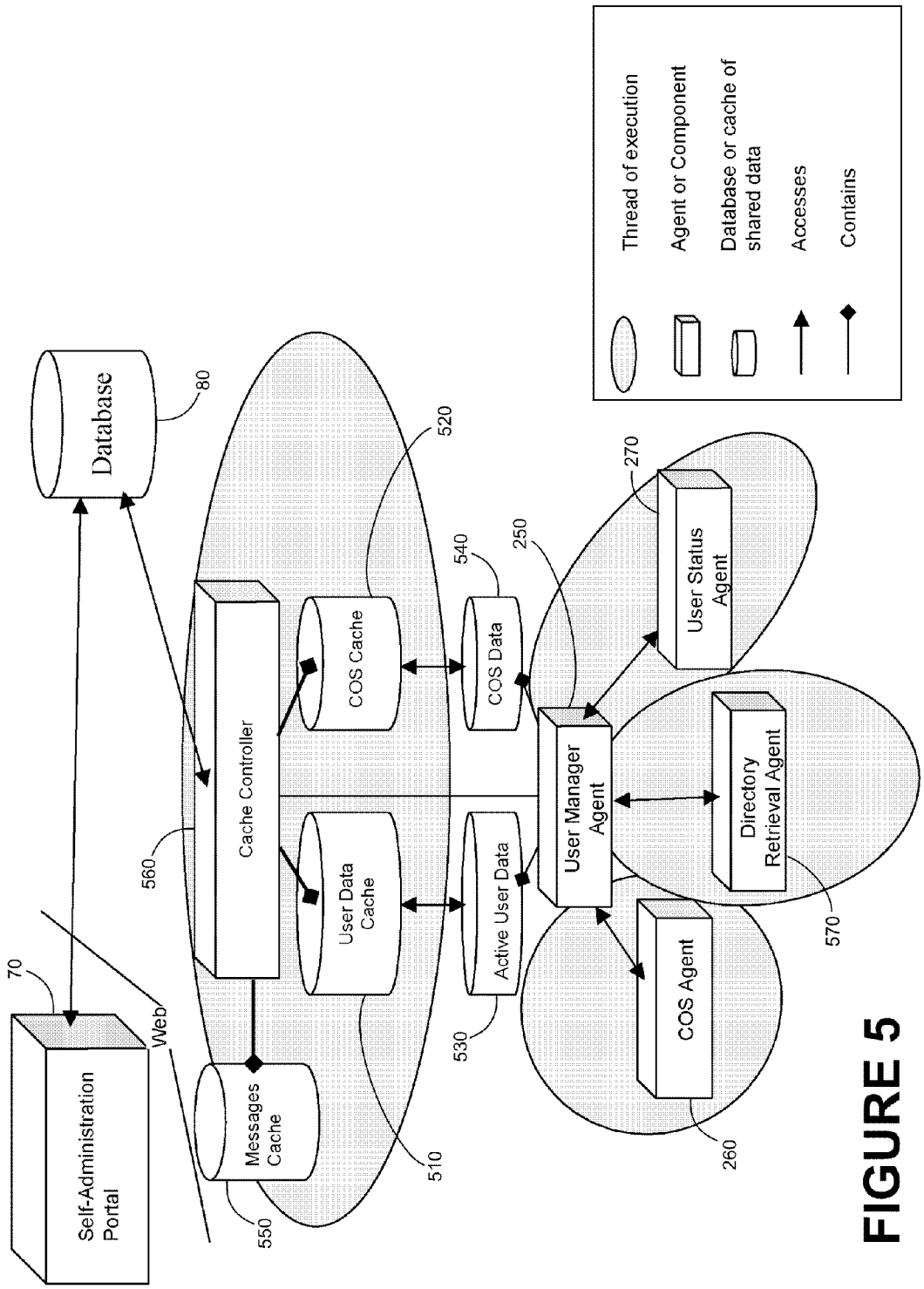
FIG. 5 shows a schematic diagram illustrating the components of the system illustrated in FIG. 1 involved in the management of subscriber accounts of the system.

With reference again to FIG. 2, and to FIG. 5 showing the components of the system involved in the management of subscriber accounts, the Class-Of-Service Agent (COSA) 260 controls the inflow of work to the Service, and acts as a coordinating point for account management as each subscriber account is processed. With respect to the alert broadcasting function of the system, however, the COSA need not be employed as, in performing such functionality, the alert message dispatcher, operating through the Administration Console 60, may manage and/or select the communications priorities governing the broadcasting of alert messages.

The system contemplates that users are classified according to a Service Level Agreement (SLA); for example, some users may receive the service without charge, while other users pay a fee. The COSA schedules work equally for all subscribers at a specific class-of-service according to the SLA, but generally gives temporal and processing priority to, e.g. paying subscribers over non-paying subscribers.

Each subscriber of the Service will have identified one or more content sources that he/she wants to have delivered to their mobile device. The COSA schedules work (a 'transaction') for each content source separately. It co-ordinates with the User Manager Agent 250 to check-out (i.e. reserve) a list of content sources which it processes (i.e. retrieves contents) simultaneously. The algorithm for checking out a content source may or may not depend on the subscriber: generally a single subscriber's content sources are scheduled for retrieval before another subscriber's sources are considered, but the COSA has information on how many transactions of each media type are active, and can leverage this to improve overall processing efficiency by scheduling different media types across different subscribers as it attempts to maintain each subscriber's SLA.

The COSA's decision to process a certain account at a certain time takes into consideration the following factors:
1. the class of service of the subscriber (i.e. premium, free, etc.) and therefore the priority of the subscriber;
2. fairness, such that all users in a specific SLA are given the same polling frequency, with the exception of when a poll takes longer than the polling frequency (in which case the account poll starts as soon as possible after the previous poll times out);
3. the type of account being processed: polling-subscriber's account, shared-forwarding account, or error account (described hereinafter); and
4. the volume of messages currently in the system.

If the system becomes too busy, due to factors such as the detection of low memory, too much subscriber content received (a good indicator of impending low memory), all pooled agents in use, an operator-imposed stand-by condition, etc., then the COSA ceases to schedule new transactions until the condition clears.

There are four 'special' subscriber content sources that the COSA must process in particular ways: a 'forwarded' account, an 'error' account, zero or more 'SMS/MMS reply' accounts, and a 'remote control' account. These may reside on any message server accessible by the system. The 'forwarded' account identifies a named Service mailbox that subscribers identify as one of their content sources. In this case, when the new e-mail is retrieved for this account, the COSA separates the e-mail into individual 'sub-transactions' for each originating subscriber found, checking out each subscriber for each sub-transaction. (Messages from unknown forwarders is discarded.) The transactions, which include the set of messages and the actual subscriber's User Data, are then forwarded to the Content Personalization Agent (CPA) 295 (and thereafter to the Content Delivery Agent (CDA) 290 for personalization and delivery as appropriate. When all individual transactions are completed the main 'forwarded' account transaction is closed.

Similarly, the 'error' account identifies another named Service mailbox that receives message bounce errors for SMTP-transmitted notifications sent by the Service. When the COSA 260 receives the new message from this mailbox from the Content Retrieval Agent (CRA) 280, it identifies the affected subscribers through matching the device e-mail address in the error e-mail. The COSA 260 then sends 'lost transaction' events to the User Status Agent (USA) 270 for each failed transmission, and the USA in turn then updates each subscriber's error status.

Similarly the 'SMS/MMS reply' account identifies one or more named Service mailboxes that receive replies to messages from SMS/MMS-enabled subscriber devices. Replies from these devices are sent from an SMS/MMS Gateway Handler (e.g. a small web application operating in the Web Application Server 50 that receives posts from the Service Provider SMS/MMS Gateway 150 and translates them to e-mail) to the named mailbox. When the COSA receives new messages from this mailbox from the CRA, it extracts the SMS message index from the message that was replied to from the mail, and the subscriber's response subject and text from each mail. The SMS indexes are matched against the transaction records stored in the User Database, and the content originator is retrieved from the matching record. The COSA then creates a transaction for the subscriber and forwards it to the CDA for delivery by electronic messaging to the original sender of the message.

Similarly, the 'remote control' account identifies a named Service mailbox that provides a subscriber-to-Service response channel for remote control of the Service while mobile. This can be supported for e-mail enabled devices directly, and for SMS/MMS-enabled devices via the same mechanism used by the 'SMS/MMS reply' method.

When the COSA retrieves new e-mail from this mailbox from the CRA, it extracts the originating device address, a command, and optionally an identifier (e.g. SMS ID or e-mail subject). The originating address is matched to a subscriber account, and if present, the identifier is matched to one of the subscriber's transactions. This capability supports commands such as:

- deleting e-mail that has been forwarded to the device from a mailbox;
- asking for full text of summarized content to be forwarded;
- selection of an alternate device (when multiple have been pre-configured);
- turning the Service notification on or off.

For commands that require access to a mailbox, the COSA originates a transaction for the subscriber, overriding the normal user preferences held in the User Data. Otherwise the COSA simply updates the cached User Data.

The COSA's standard responsibilities are therefore:

- to determine at what frequency the forwarding and error mailboxes are polled in relationship to the polling frequency of the subscriber accounts;
- to ensure that the each subscriber account is opened, processed and closed successfully in accordance with the SLA;
- to recognize the changing load and adapt the scheduling rate as subscribers turn off or on notification, and as new subscribers are added;
- optionally, to limit the maximum number of messages forwarded and maximum number of bytes processed per user per day;
- optionally, to limit the total number of bytes processed;
- if a subscriber is in 'notification off' mode, to not send a request through the system, whether it originates from normal subscriber processing or from the forwarded mailbox; and
- to handle errors encountered during the processing of each subscriber account, allowing the system to recover appropriately.

When subscribers configure their mailboxes to auto-forward messages to one of several communal mailboxes (one per SLA) (instead of having the Service poll the subscribers mailbox), the responsibilities of the COSA are:

- to sort the messages by username and time received;
- to validate the user identities, filtering out any spam and other non-subscriber messages; and
- to group messages by user and send each set of mail to the appropriate Content Personalization Agent Pool Manager for parsing and processing.

Service User Management Agent

The User Manager Agent (UMA) 250, shown in FIGS. 2 and 5, coordinates all access by the Service agents to subscriber accounts within the User Database 80. It provides an API supporting the various query types required by the other agents, such as adding or removing subscribers, checking for the existence of a particular subscriber, matching a subscriber name with their password, and the retrieval and storage of User Data objects that each contain all information required to processor a subscriber (account details, content sources, mobile devices, and personalization preferences).

As illustrated in FIG. 5, the UMA maintains cached copies 510, 520 of the User Data 530 and Class of Service (COS, i.e. SLA) Data 540, as well as a Messages Cache 550 of end-user messages, in the User Database 80 via a Cache Controller 560. The Cache Controller 560 independently maintains the caches 510, 520, 530 by periodically synchronizing them with the User Database 80. For efficiency, the UMA 250 also keeps read-only copies of the User Data 530 for subscriber accounts that are in a 'forward' state (i.e. not those that have temporarily turned off the Service). As the User Data 530 is changed from transaction processing, it is written back into the User Data Cache 510, which is then synchronized with the Database 80 sometime later. Similarly, if the User Data Cache 510 is updated from the User Database 80, the changes are propagated into the read-only copies for the next subscriber transaction.

The UMA 250 optionally collaborates with an optional Directory Retrieval Agent (DRA) 570 (discussed further hereinafter) for the purpose of managing subscriber population in the User Database 80. If the DRA 570 is not used, the subscriber population in the User Database 80 is managed via the Self-Administration Portal 70.

The UMA 250 collaborates with the COSA 260 for the purpose of scheduling of subscriber processing by being ready to service a request for the next user to process from the User Data Cache 510. The request for the next user could be specified as the next user of a specified SLA, as the forwarding account for a specific SLA, or as the error account for the system.

The UMA 250 further collaborates with the COSA 260 for maintaining consistent representations of subscribers' content sources, and updating dynamic information about the processing of subscriber accounts such as counts of messages processed, the number and type of errors encountered, and the success/failure of each process cycle (transaction), used for reporting purposes. The representations of subscribers' content sources generally involve taking a snapshot of the current state. For example, a mailbox state representation would include the arrival date of the last mail received at polling time, and a blog state representation would include the posting date of the last message at polling time, and a document repository representation would include the date of the last document updated at polling time.

The UMA implements the above-described database cache for efficiency reasons. The cache is updated on a periodic cycle, and holds the sets of User Data for each SLA level, the per-subscriber errors encountered, the transactions records, the parameters for each SLA level, and the list of notification messages provided to subscribers and administrators under error conditions. The cache provides the following access methods:

- check-out—read cached data and apply write lock (no additional check-out is allowed and no writes are allowed until the record is checked-in);
- read—read-only with no lock on data;
- write—write non-transaction-related data into the cache (queued if a write-lock is in place);
- check-in—write back into cache, removal of write lock, and processing of any queued writes; and
- update—write out cached data that has been changed to the database, and read in any new data provided by external sources (such as the Self-Administration Portal or the Administration Console).

In performing its alert broadcasting functionality, the system 10 may employ the User Manager Agent 250 to retrieve from the Database 80 the device addresses of any subscriber user device or other end user device. In particular, if an alert message broadcast package received by the Broadcast Agent 297 identifies target end user devices but does not also specify the device address of such end user device, then the Broadcast Agent 297 may query the Database 80 via the User Manager Agent 250 for such address.

Service Directory Retrieval Agent

As indicated above, the Service optionally includes a Directory Retrieval Agent (DRA) 570 for managing the subscriber population. It periodically accesses a network directory resource 127 (e.g. corporate directory server), optionally over an encrypted channel, to monitor membership in a named distribution list, then synchronizes the membership of that list to the subscribers held in the User Manager Agent (UMA) 250, including any changed information such as user name, mailbox name, and mailbox server.

To find the named distribution list, the DRA 570 accesses the directory server 127 (e.g. via the Lightweight Directory Access Protocol) and searches for the list of members. Once the list is found, it is traversed to discover all members, including those that are in nested distribution lists. A maximum nesting depth is used to prevent the possibility of one distribution list nesting a second distribution list that contains the first one. A further check is made to ensure there is no member duplication, and that all necessary attributes (user name, mailbox name, and mailbox server) are present.

Synchronization of the member list with the subscriber list is achieved by checking for the existence of each member in the User Database 80 (via the User Manager Agent 250). If the member is not subscribed, he/she is added to the User Database 80. If the member is already subscribed, the subscriber attributes are checked against the directory attributes, and updates are applied if necessary. If a subscriber is not in the member list, he/she is deemed to be unsubscribed, and the User Manager Agent 250 is asked to change the subscriber account status to unsubscribed.

In performing its alert broadcasting functionality, the system 10 may employ the Directory Retrieval Agent 570 to retrieve from the Directories 127 the device addresses of any subscriber user device or other end user device. In particular, if an alert message broadcast package received by the Broadcast Agent 297 identifies target end user devices but does not also specify the device address of such end user device, then the Broadcast Agent 297 may query the Directories 127 via the Directory Retrieval Agent 570 for such address.

Service User Status Agent

The User Status Agent (USA) 270 tracks subscriber account status, maintaining subscriber account status in the User Database 80 for administrative monitoring, and alerting subscribers of persistent problems experienced with their Service account. It is also responsible for extracting subscriber information from bounce/failure messages retrieved from the system error mailbox.

The USA receives events from all transaction processing agents in the application (Content Retrieval Agent 280, Content Personalization Agent 295, and Content Delivery Agent 290) for indication of subscriber transaction status updates. Specific responsibilities are:

- updates subscriber status after content has been retrieved, after content has been delivered, and whenever transactions are lost;
- decides when particular subscribers are in an error state based on Service Level Agreement parameters and status events;
- removes subscribers from error state once Service Level Agreement conditions are satisfied;
- informs subscribers by sending notifications (e-mail messages) of problems encountered while processing their e-mail; and
- monitors subscriber account transactions and writes closed transactions to the database.

Service Content Retrieval Agents

The Content Retrieval Agent ("CRA") 280 is a pool-able object. When given a subscriber's content source description, it dispatches a pooled agent appropriate for the content media type. For example, a mailbox source is serviced by an e-mail retrieval pooled agent, whereas a web content feed might be serviced by an RSS retrieval pooled agent.

The pooled agent connects to that subscriber's content source and downloads any new content that it has not yet seen, which generally means content that has appeared since the last poll. The method for doing this is different between different content types and standard/proprietary access protocols, hence the need for media-specific pooled agents. After retrieval completes, the CRA 280 creates an array of content items and returns these to the Class of Service Agent 260 for further processing. For example, the CRA receives a subscriber's mailbox information from the Class of Service Agent 260. It uses this information to connect via an e-mail retrieval protocol (such as secured IMAP or POP3, or a proprietary method such as Microsoft's MAPI) to the remote mail server (e.g. the Internet Mail Stores 120 shown in FIG. 1), and then downloads e-mail that has arrived later than the time of the previous poll from the subscriber's inbox (or other folder). (Note: for POP3 retrieval the entire mail folder must be downloaded and filtered through to find the new messages.) All content is left untouched on the server.

The standard CRA responsibilities are therefore:

- to assign a pooled agent appropriate for the content type;
- to connect to subscriber content sources;
- to identify newly-arrived content by comparing to previous poll results;
- to capture the new status of the content source;
- to send the processing result back to the COSA; and
- to send a retrieval status message to the User Status Agent.

For subscribers selecting a forwarded e-mail content source (where they arrange to have e-mail forwarded to a named Service mailbox), the COSA's request to the CRA includes the account information of the shared mailbox (i.e. as a 'special' subscriber). The CRA e-mail pooled agent collects all of this mail, deletes it from the named Service mailbox, and returns it to the COSA for 'forwarded' processing. A similar approach is used for the 'error' mailbox, where the account information of the Service error mailbox (i.e. as another 'special' subscriber) are processed and returned to the COSA for 'error' processing.

So the CRA responsibilities in these situations are:
to connect to the communal mailbox;
to retrieve all of the forwarded or error messages and delete it from the server;
to get original sender (or mobile device address) from message bodies; and
to send the processing results back to the COSA.

It will be appreciated that as new content types, media types, and content sources become available, the Service may be dynamically updated simply by the specification and provision of new Content Retrieval Agents configured to process such new sources. Particularly, the agent framework is extensible for operating such new Content Retrieval Agents for retrieving content from the new sources. Consequently, the remainder of the system may remain ignorant of and indifferent to the means by which the network content is retrieved for processing and forwarding to the mobile devices; even when a new Content Retrieval Agent is introduced, the same Content Personalization Agents and Content Delivery Agents may be used.

In general, the Content Retrieval Agent 280 need not be used in connection with the system's alert broadcasting functionality, inasmuch as the content of the alert message is provided by the dispatcher via the Administration Console 60 as described herein. However, it is contemplated that the Content Retrieval Agent 280 may be used in providing the alert broadcasting functionality of the system 10. For example, the alert message may be constructed by the dispatcher so as to incorporate certain content to be retrieved from an external source (e.g. a graphic image showing containing a map of an affected area, or showing a safe escape route, or an audio file containing a police announcement). In such case, the Broadcast Agent 297, described further hereinafter, may employ the Content Retrieval Agent 280 to obtain such externally-sourced content for incorporation into the alert message before communicating the message to the target user device. In general, the Content Retrieval Agent 280 may generally be employed as a means for obtaining content from any source accessible by the system 10.

In addition, the Content Retrieval Agent 280 may further be employ by the client tracking agents for monitoring of mailbox for receiving communications from monitored device clients including location information or alert broadcast responses.

Service Content Personalization Agents

The Content Personalization Agent (CPA) 295 is a poolable object used to apply user-preferences to filtering and formatting source content. When given a subscriber's content from a specific source from the Content Retrieval Agent 280 via the Class of Service Agent 260, the CPA dispatches a pooled agent appropriate for the content media type. For example, a mailbox source is serviced by an e-mail-aware pooled agent, whereas a web content feed or service alert might be serviced by an HTML-aware pooled agent. The CPA processes the set of content and creates a new array of device-dependent content to be delivered to the subscriber's device. Once it has finished processing it replaces the set of retrieved content in the payload object with the array of content to be forwarded. The payload is then forwarded to the Content Delivery Agent 290.

The CPA performs two general functions: determining whether a specific content item is forwardable, and formatting the content for presentation on the device. Determining whether a message is forwardable is implemented in several stages. First, the originator address is matched (with wildcard support) against an 'address whitelist', where a match indicates the content should be forwarded. If the 'address whitelist' is empty, the match is taken to be true. If no match is found, the text of the content (e.g. subject, body text, attachment titles, and optionally attachment text and metadata) is matched with wildcards against a 'phrase whitelist'. If no match is found, the content is deemed non-forwardable. If a match was found, the originating address is then matched against an 'address blacklist' (again with wildcard support), and the text of the content is matched against a 'phrase blacklist'. If a match is made on either of the blacklists, the content is deemed non-forwardable. Otherwise it will be forwarded to the device. These filtering methods are extendible in several ways. For example, the whitelists and blacklists can be supplemented by Service-wide lists provided by a corporate compliance officer, or could be provided in the form of category matches where the CPA matches against word lists or Bayesian filters if the User Data specifies these, or even whitelists and blacklists provided on centralized Directory Servers (e.g. a subscriber's contact list in the corporate directory).

If the content is forwardable, the CPA then formats it for presentation on the device. The formatted result can consist variously, depending on the device capabilities, channel capabilities, and user preference, of any of the following limited set of examples:

the entire content (including attachments);
just the passive or active text extracted from the content;
a summary of the text of the content;
translations of text from the content (or of summaries of the content);
a list of any attachment names;
URLs pointing to a server that provides mobile rendering of attachments;
summaries of textual attachments;
translations of attachments (or of summaries of attachments);
rendered lower definition versions of images in, e.g. attachments; and/or
extracted portions of the content or attachments (e.g. first N bytes/N seconds of a media stream).

In addition, the CPA can filter all or a part of the network content in accordance with the user preferences or otherwise.

After the set of content is processed, the CPA 295 forwards the collection along with the User Data to the Content Delivery Agent 290 for delivery if necessary.

It will be appreciated that, as new content and media types become available, as well as new methods for processing or personalization such content, the Service may be dynamically updated simply by the specification and provision of new Content Personalization Agents configured to carry out such processing or personalization. Particularly, the agent framework is extensible for operating such new Content Personalization Agents. Consequently, the remainder of the system may remain ignorant of and indifferent to the means by which the retrieved network content is processed for forwarding to the mobile devices; even when a new Content Personalization Agent is introduced, the same Content Retrieval Agents and Content Delivery Agents may be used.

In performing its alert broadcasting functionality, the system 10 may be configured such that, in preparing the alert message and broadcast package, the dispatcher using the Administration Console 60 selects the alert message format with the assistance of message templates which limit or otherwise predetermine the alert message content and form to be suitable for communication and display/performance on a related target/user device type. Such templates may be as simple as specifying that the alert message may be text only, e.g. of a limited number of characters. In such case, the system 10 need not employ the Content Personalization Agent 295. Alternatively, an alert message received from the Administration Console 60 may, at the request of the Broadcast Agent 297 or otherwise, be processed by the Content Personalization Agent 295 for, e.g. rendering the message displayable/performable on a given target user device, or context-appropriate to a target user device's logical or physical location. Any of the functionality described hereinabove in connection with the content retrieval and forwarding functionality of the system may be employed for such purpose.

Service Content Delivery Agents

The Content Delivery Agent (CDA) 290 is a pool-able agent. Its role is to forward processed content to the subscribers' devices. With the receipt of a payload of processed content from the Content Personalization Agent 295, the CDA 290 dispatches a pooled agent appropriate for the type of channel available to reach the device (e-mail, push e-mail, SMS, MMS, proprietary, etc.). The pooled agent then determines the device address (and other protocol parameters) from the User Data sent along with the content. It then sends off the processed content to the device. For example an e-mail-enabled device receives the content via an SMTP gateway (e.g. an SMTP MTA 140 as shown in FIG. 1), and an SMS-enabled device receives the content via an SMS gateway (e.g. a Service Provider SMS Gateway 150 also as shown in FIG. 1). The CDA 290 notes pertinent details such as the content originator's address and if applicable, the SMS ID for storing in the record of the transaction that is stored in the User Database 80. (This is used by the 'SMS/MMS reply' account mechanism.)

When processed content is sent to a subscriber's device, the 'from' and/or 'reply to' addresses are set to be those of the original sender where appropriate. For example, with e-mail forwarding this allows the subscriber to reply to the originator directly from his device. For the example where e-mail is forwarded via an SMS gateway, the reply-to address maps to one of a set of specific SMS addresses which forward the received reply along with the device SMS address to one of a set of special named mailboxes for replies. These mailboxes are serviced by special 'SMS/MMS reply' subscriber accounts on the Service, where the replies are retrieved and then matched to the subscriber and forwarded to the originator by the Class of Service Agent (COSA).

When personalized content is too large for an individual device message (e.g. for SMS one message is only approximately 150 characters, or approximately 15 words), the content may be sent in several messages, subject to user personalization in the device definition. Examples of personalization include maximum message size, maximum number of separate messages, and whether or not content should be truncated to fit.

Error responses from the device are handled in protocol-specific ways. Protocols such as SMS and e-mail may experience immediate or delayed errors. Immediate errors are handled either by attempting delivery to an alternate device if one is configured (which requires special error handling by the COSA if the alternate device has a different delivery channel), or by the immediate initiation of a 'lost transaction' message to the User Status Agent or by marking the transaction as failed back to the COSA. Delayed errors, e.g. those caused by an e-mail bounce or a device being unreachable for several hours, are handled by the 'error' subscriber account method.

Secure delivery of content to the mobile device is achieved in a protocol-specific manner. For e-mail-enabled devices, if the device supports encrypted e-mail the subscriber provides his public key to the Service upon identification of the mobile device, and at the same time receives the Service public key from the subscription process. (An unencrypted e-mail containing the key is sent to the device.) When delivering the content, the CDA encrypts the mail. For SMS- or MMS-enabled devices, a similar mechanism is used, but a specific client plug-in is required on the device. This plug-in also enables the concatenation of multiple messages together to form a larger message than would otherwise be allowed given the small size of SMS messages. In this case the CDA encrypts the entire personalized content, sending it in parts to the device, where each part is sequentially tagged for parsing by the plug-in. After receiving all parts, the plug-in decrypts the message for display to the subscriber.

Such a device plug-in can be used to provide further functionality, such as recognizing 'active tags' that identify the telephone number or Instant Message chat handle of the message originator. Active tags can also be used to trigger a user action such as payment for a product or service. For devices enabled with such a plug-in, the CDA attaches the appropriate tag(s) for the originator if it matches one in a personal contact list included in the User Data provided by the COSA. When the plug-in detects the presence of one of these tags, it would enable the subscriber to initiate a voice call or IM chat at the push of a button while reading the forwarded content.

It will be appreciated that, as the capabilities of mobile devices evolve, and as the modes of communication change, the Service may be easily dynamically updated by the specification and provision of new Content Delivery Agents configured to carry out such delivery. Particularly, the agent framework is extensible for operating such new Content Delivery Agents. Consequently, the remainder of the system may remain ignorant of and indifferent to the means by which retrieved and processed network content is forwarded to mobile devices; even when a new Content Delivery Agent is introduced, the same Content Retrieval Agents and Content Personalization Agents may be used.

In performing alert broadcasting, the system 10 may employ the Content Delivery Agent 290 as described above, wherein, e.g. the Broadcast Agent 297 delivers an alert message (which may have been processed by the Content Personalization Agent 295, as described above) to the Content Delivery Agent 290 for communication to the target user devices. Alternatively, and as discussed below, the Content Delivery Agent 290 need not be used for such purpose, and the alert message may instead be communicated to the target user devices otherwise (e.g. by a pooled Broadcast Agent 297 generated for such purpose). Alternatively, as discussed above, the system may also provide device delivery agents 1030 specifically for the alert broadcasting function of the system.

Service Broadcast Agents

The Broadcast Agent (BA) 297 is a pool-able agent. In general, the Broadcast Agent 297 may be configured to perform all or a part of the functionality of the delivery module 730 of the general system 710. Its role is to deliver broadcast alert messages to target devices. With the receipt of a message payload from the Administration Console 60 via the Management Adapter 65 and Management Agent 240, as described hereinabove, the BA 297 may retrieve the targeted device addresses from the information sent along with the message content. These addresses are retrieved variously from the User Manager Agent 250, from the Directory Retrieval Agent 570, or directly from local networking equipment (such as a WiFi controller), as described hereinabove. The BA 297 then passes the message and target device addresses to sets of the pooled agents it manages. In an embodiment where the functionality of the specific delivery sub-modules 800, 810, 820,

830, 860 of the general system 710 is implemented in the BA, then a number of different sub-types of pooled agents are activated in order to communicate with any particular device based on the protocol or communications path required to reach that device, e.g. SMS, MMS, SMTP, IP (proprietary), voice (proprietary/VoIP). For example, a small number of SMTP-capable pooled agents can reach a large number of e-mail-accessible devices, whereas a large number of IP-capable pooled agents would be used to reach a large number of WiFi-accessible devices. Alternatively, as described above, the BA 297 may engage the Content Delivery Agent 290 to forward the alert message to the specified target devices.

Similarly, the Broadcast Response Agent 275 is also a pool-able agent. The Broadcast Response Agent 275 may implement all or part of the functionality of the response handler 760 of the general system 710. Alternatively, such functionality may be implemented variously in other agents and described hereinbelow.

When an alert message to be broadcast is received by the BA 297, it retrieves the addresses of recipients' target devices. Recipients are specified in several ways, e.g. by attributes within the Service Database 80 (e.g. Service ID, wireless carrier used, e-mail source domain, etc.); by attributes within a Directory 127 (e.g. a corporate directory providing location, membership of a distribution list, etc.); by associations in a network infrastructure (e.g. accessible through the Communications Interfaces 125, such as an association with an access point, membership in a domain, etc.). For database-related attributes, the BA 297 may request the targeted subscriber address list (e-mail addresses and/or IP addresses and/or DNS-resolvable hostnames and/or MAC addresses and/or phone numbers) from the User Manager Agent (UMA) 250. This list may optionally include subscriber-specified device priorities, which the BA 297 may use to determine which devices to target for each subscriber. For directory-based attributes, the BA 297 may request the address list (hostnames and/or e-mail addresses and/or phone numbers) from a Directory 127. For networked-associated attributes, the BA 297 requests the address list (IP addresses and/or hostnames) from a Directory 127 and/or Communications Interfaces 125 (e.g. wireless network controllers). This may include a request for mapping MAC addresses received from the UMA 250 into the currently-assigned IP address.

The BA 297 may also combine attributes to determine the target device addresses. For example, a broadcast alert message may be targeted at the SMS devices of all subscribers whose recorded device MAC addresses are associated with a specific set of WiFi access points. In such case, the BA 297 would match MAC addresses for given access points retrieved from a wireless LAN controller against MAC addresses associated with subscriber data returned from the UMA 250 to determine the list of SMS addresses to target.

The following provides details of the functionality of the Broadcast Agent 297 when it implements the functionality of the delivery sub-modules 800, 810, 820, 830, 860 of the general system 710 rather than employing the Content Delivery Agent 290, as described above.

For delivery to e-mail addresses, the BA 297 provides the complete set of target e-mail addresses to a single SMTP-capable pooled agent. This SMTP pooled agent may divide the large list evenly into a number of smaller lists, based on a locally-configured maximum list size, then initiates an e-mail to the local MTA (e-mail gateway), blind-copying each of the recipients in the smaller lists. The MTA then transfers the e-mail to the destination e-mail as efficiently as possible based on the number of simultaneous transfers enabled on the MTA. The pooled agent lists success/failure for each e-mail address delivery in a report back to the Management Agent 240 upon completion. In another embodiment, the Broadcast Response Agent 275 may receive or otherwise obtain responding e-mail messages from the target devices for reporting to the Management Agent 240.

For delivery to SMS/MMS addresses, the BA 297 divides the list of targeted phone numbers into smaller lists by carrier, each of up to a configured maximum size. These smaller lists are then divided up amongst the available SMS/MMS-capable pooled agents, up to a configured maximum. (Such a maximum allows for the option of broadcasting a multiplicity of different alert messages simultaneously.) Each pooled agent then initiates a connection to the carrier gateway (e.g. the Service Provider SMS/MMS Gateways 150) and initiates transfer of the messages. The transfer may be staged based on previously known characteristics of the carrier gateway traffic handling capability. The pooled agent lists success/failure for each SMS/MMS delivery in a report back to the Management Agent 240, periodically if delivery is over an extended time period, and upon completion. In one embodiment, the Broadcast Response Agent 275 is configured to receive responding SMS/MMS messages from the target user devices for reporting to the Management Agent 240.

For delivery by voice to telephony-based devices, the BA 297 divides the large list evenly across a pre-configured number of available dialer-capable pooled agents, e.g. one agent per dialer, up to a configured maximum to allow for simultaneous broadcasts. These pooled agents then request their pre-configured external dialers (e.g. in the Communications Interfaces 125) to initiate outbound voice calls over trunks or VoIP (SIP) connections, using a voice-encoded message payload. The dialer then calls each recipient, transcoding the voice-based message to the end-users when each call is answered. The dialer can optionally leverage DTMF receivers to allow recipients to confirm receipt. The dialer agent lists success/failure for each call in a report back to the pooled agent upon completion. The pooled agent then passes this report back to the Management Agent 240. In another embodiment, the Broadcast Response Agent 275 receives information from the dialer indicating success/failure for each call and reports the same to the Management Agent 240.

For delivery to IP-networked devices, the BA 297 divides the list of IP addresses and/or hostnames evenly amongst the available IP-capable pooled agents, again up to a configured maximum to ensure support of multiple simultaneous broadcasts. In the case that the system employs alert message authentication, the BA 297 first requests a tag and private key from the Key Server Agent 298, and uses the key to encrypt a part of the message, which may be the current time. The tag and encrypted time are passed along with the message, any attachments, and the target address list to the pooled agents. The pooled agents then attempt to connect to each IP device in turn on a well-known port, waiting a configured amount of time for a response. When a device accepts the connection, the pooled agent transfers the message payload, closes the connection and initiates a connection to the next device in its list. For any unreachable devices, the pooled agent retries the connection a configurable number of times before giving up. This is in case the device is moving in-and-out of a specific wireless zone, or is otherwise temporarily unable to respond. The pooled agent lists success/failure for each networked device in a report back to the Management Agent 240 upon completion. In another embodiment, the Broadcast Response Agent 275 receives information from the target devices or intermediating communications nodes or interfaces indicating success/failure for each attempted communication, and reports the same to the Management Agent 240.

The agent resident on the IP-networked devices may be pre-configured to start up when the device operating system starts up, and is preferably configured to listen on a well-known port for incoming connections. When a message payload is retrieved from the BA 297, the device agent then initiates an IP connection to the pre-configured Key Server Agent 298 (discussed further below), and passes the tag provided by the BA 297 pooled agent. The Key Server Agent 298 responds with a public key, which the device agent then uses to decrypt the message timestamp. If the timestamp decrypts successfully and is within a pre-configured window of the current time on the device, the device agent displays the message to the user, optionally with a warning bell or tone. This mechanism is intended to defeat sniffing, replay, and address spoofing attacks.

This public key method can be used for any data-networking-enabled devices, including smartphones, local wireless handsets, mobile/non-mobile PCs, etc. Other devices (like SMS/MMS-only cellphones) can be protected at a lower level by pre-configuring symmetric keys (or a list of symmetric keys to be used in order). In this case, the agent resident on the device would decrypt the message timestamp using the locally-stored key instead of requesting the key from the Key Server Agent 298. As in the public key case, the timestamp would then be compared to the local device time, and the message would only be displayed if the time matches within a configured window. Devices without an agent will provide the message to the end-user without any authentication.

Note that each pooled agent can be implemented in a protocol-specific way as described above, or can be implemented to adapt to any protocol requested of it.

Service Key Server Agents

The Key Server Agent (KSA) 298 provides a method for recipients to authenticate messages received from the Service. It is primarily seen as a method to protect devices from false alert broadcasts as described above, but could also be used to securely encrypt and authenticate single-user content notifications.

The KSA 298 maintains a time-sensitive list of key-pairs, indexed by tags. The KSA 298 creates a key-pair using public key algorithms along with its indexing tag upon request of the Broadcast Agent 297 (or the target device) when it is preparing to originate a message. The KSA 298 responds with the tag and the private key, which the requesting agent uses to encrypt all or part of the message. The KSA 298 maintains the key-pair for a pre-configured time period, usually on the order of minutes. A short life reduces the chance of attempts to playback sniffed keys in order to provide false positive authentication of broadcasts.

The KSA 298 also listens on a well-known port for external connections from devices, receiving a tag and responding with the corresponding public key, if it still exists. Devices use this key to decrypt the encrypted part of the message received from the transmitting agent. If the key doesn't exist or does not correctly decrypt, the message is not displayed to the device end-user.

Service Broadcast Response Agents

The Broadcast Response Agent 275 is a pool-able agent that collects responses to broadcasts (receipt confirmations). It may be employed to perform all or part of the functionality of the response handler 760 of the general system 710, as described above. In general, the Broadcast Response Agent 275 may be employed to receive or otherwise obtain response messages from the target user devices which acknowledge receipt of the communicated alert message and which may also provide any desired information to the Broadcast Response Agent 275.

For example, the Broadcast Response Agent may collect responses from asynchronously-connected end-user devices (e.g. SMS/MMS and e-mail devices). It may create pooled agents to listen for incoming SMS responses from, e.g. the Service Provider SMS/MMS Gateways 150, and periodically poll a pre-configured e-mail response mailbox, created and maintained for such purpose (e.g. in the Corporate Mail Stores 110), for end-user responses (or may request the Content Retrieval Agent 280 to do so). Response confirmations may be sent to the Management Agent 240 for collection and transmission to the Administration Console 60 for display and reporting.

Information Flow—Content Retrieval/Forwarding Functionality

Figure 6:
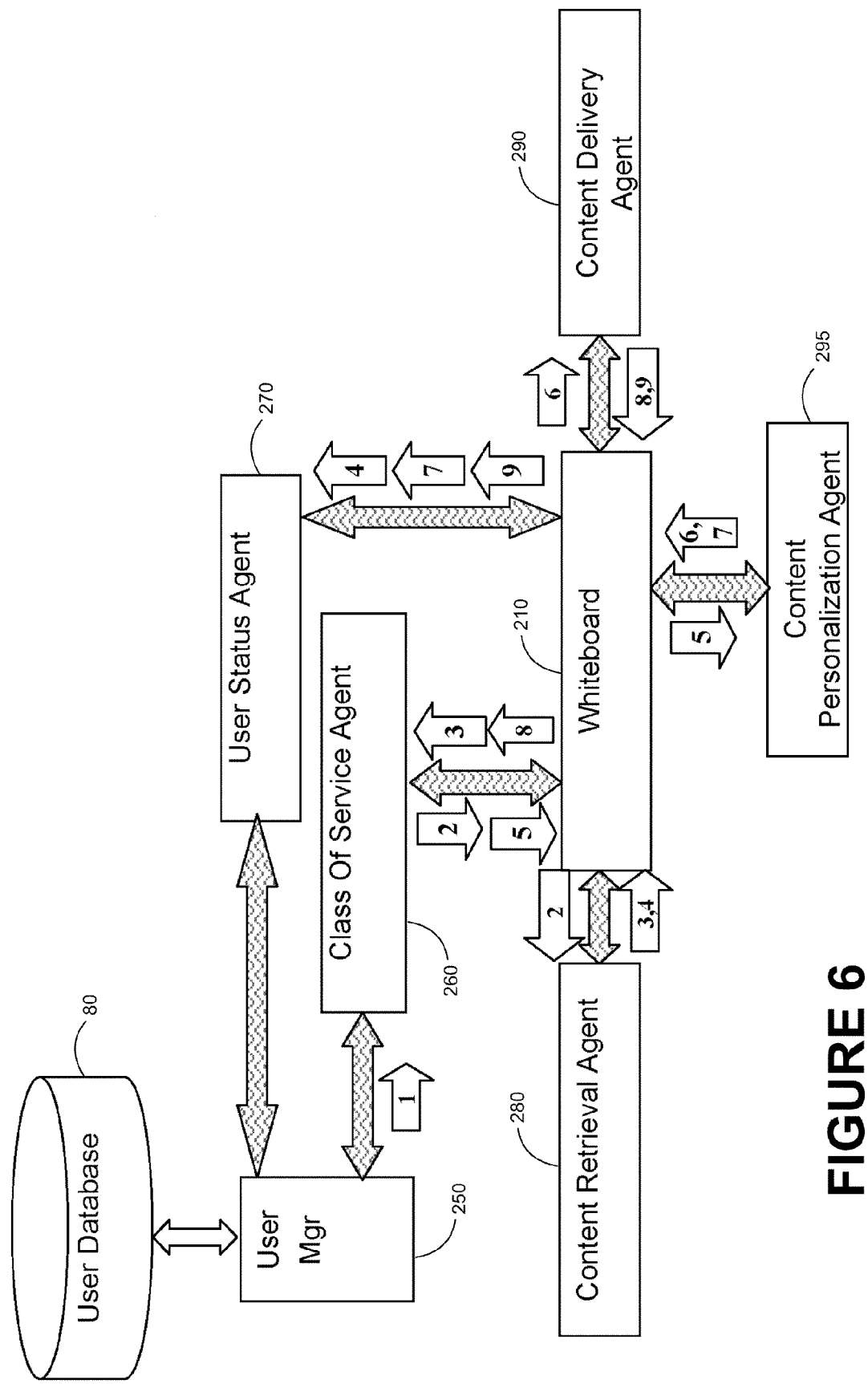
FIG. 6 shows a schematic diagram illustrating the flow of information through the system with respect to the content retrieval/forwarding service illustrated in FIG. 5.

FIG. 6 shows a schematic diagram illustrating the flow of information through the system in connection with the content retrieval and forwarding functionality of the system. Information flows in the Figure are shown as numbered open arrows and are referenced hereinafter by inclusion in brackets of the number identifying the flow. The shaded arrows in the Figure generally show information flow between the various components. In general, where a subscriber profile specifies external content to be accessed by the system, content arriving at such sources will not be retrieved by the system until the sources are polled by the system. As described above, the Class of Service Agent (COSA) 260 is configured to schedule the polling of user content sources in accordance with the Service Level Agreements (SLAB) and other parameters stored in the User Database 80. The COSA 260 therefore accesses the User Database 80 periodically via the User Manager 250 (flow [1]) in order to determine and update such scheduling.

When the polling of a subscriber's content sources is scheduled to occur, the COSA 260 notifies the Content Retrieval Agent (CRA) Pool Manager 280 (via the Whiteboard 210, as is all inter-agent communication) (flow [2]) to retrieve content from the configured sources. The message sent to the CRA Pool Manager 280 includes the subscriber User Data retrieved from the User Database 80. The CRA Pool Manager 280 then selects the next available pooled agent of the appropriate media type to perform the retrieval. The content retrieved is generally left untouched (i.e. a copy is retrieved by the CRA 280), but in appropriate cases (e.g. e-mail), if the subscriber preferences so direct the content may optionally be deleted from the source. Once the CRA pooled agent is finished its work, the CRA Pool Manager 280 then returns a collection of content to the COSA (flow [3]) (again, via the Whiteboard 210) and sends a status update to the User Status Agent (USA) 270 (flow [4]).

The COSA 260 in turn then forwards the retrieved content along with the User Data to the Content Personalization Agent (CPA) Pool Manager 295 (flow [5]) for processing. A media-appropriate CPA pooled agent is selected, which analyzes the individual content for relevance to the subscriber (per the preferences specified in the User Data), and then, when relevant, summarizes or otherwise formats the content as a separate message for the subscriber's device. The CPA 295 then forwards the collection of messages along with the User Data to the Content Delivery Agent (CDA) Pool Manager 290 (flow [6]) and sends a status update to the USA (flow [7]).

The CDA Pool Manager 290 then selects a channel-appropriate pooled agent to deliver any forwardable content to the subscriber's device. The pooled agent formats the channel 'envelope' (e.g. SMTP protocol sender and reply-to header, SMS header originator header, etc.) to indicate an appropriate return address, allowing the subscriber to respond to the message if appropriate. Upon completion of transmission, the CDA 290 sends notification to both COSA 260 (flow [8]) and the User Status Agent 270 (flow [9]) (for monitoring of subscriber account status).

When the COSA 260 receives notification of completion of that request, the account is checked back into the database.

Timer expirations at any stage of transaction processing will lead to a transaction being flagged as having been 'lost'. Depending upon the protocol scenario, the timeouts can require that a pooled agent be forcefully terminated (and then re-incarnated) by the Pool Manager (e.g. a timeout when retrieving e-mail from a POP3 mailbox). Smarter protocols provide their own timers, allowing the pooled agent to recover. In both cases, the 'transaction lost' message is sent to the USA, and the appropriate response message is sent to the COSA to indicate the transaction has completed (albeit unsuccessfully).

Many subscriber transactions can be in process in the Service simultaneously, bound by the high water marks of the numbers of content retrieval, processing, and delivery agents. Each transaction follows the information flow described above.

Embodiment Options

Although various exemplary embodiments of the invention have been disclosed, it should be apparent to those skilled in the art that various changes and modifications can be made which will achieve some of the advantages of the invention without departing from the true scope of the invention.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

It is to be appreciated that the section headings appearing hereinbefore do not limit the scope of the invention as described but are merely intended to organize the description for the sake of clarity.

With the foregoing exemplary embodiments having been disclosed, it will be apparent to those skilled in the art that various changes and modifications can be made to appropriately suit the needs and objectives of another application and still achieve the advantages of the invention; all such changes and modifications are intended to fall within the scope of the invention as defined by the claims that follow.

What is claimed is:

1. A system for discovering at least one target recipient communications device currently located in a target physical location selected from a plurality of selectable physical locations and communicating a message through a communications network to said target recipient communications device, the communications network comprising a plurality of network sources, at least one logical location accessible to each said network source and a plurality of recipient communications devices, each said recipient communications device being accessible to at least one said network source via at least one said logical location accessible thereto by using a respective address for said recipient communications device, the system comprising one or more computer processors accessible to one or more databases, the database(s) comprising the selectable physical locations and a plurality of recipient communications device specifications wherein each said specification comprises a pre-registered address for said respective recipient communications device, and program instructions executable by the one or more computer processors to provide:

(a) a location discovery module configured for:
querying at least one said network source that is currently accessible to the system to identify a logical location accessible to that network source;
  (ii) receiving for each said identified logical location a physical location associated with said identified logical location; and,
  (iii) updating said one or more databases to associate a specification of each said identified logical location with a specification of said physical location received for said identified logical location and said network source to which said identified logical location is accessible; and,
(b) a recipient communications device discovery module for discovering the at target recipient communications device after receiving a specification of the selected target physical location, the recipient communications device discovery module configured for:
  (i) retrieving from said one or more databases at least one said specification of said logical location associated with a specification of said selected target physical location and said specification of said associated network source; and,
  (ii) obtaining from said retrieved network source an address of at least one said recipient communications device currently accessible to said retrieved network source via said retrieved logical location, wherein said obtained address is not one of said pre-registered addresses and is obtained by monitoring the communications network for usage of a predetermined communications protocol indicating admission or availability of the at least one said recipient communications device, wherein the predetermined communications protocol is one of the following: (i) DHCP, and wherein the communications network comprises an IP network and the obtained address is an IP address, wherein the IP network is monitored for DHCP IP address lease allocation and de-allocation packets and the logical location(s) and associated network source(s) having active IP address leases are identified; (ii) SNMP, and wherein the communications network comprises an IP network, the obtained address is an IP address and is retrieved from the payload of an SNMP Trap packet and wherein the IP network is monitored for SNMP Trap packets; (iii) voice-over-IP (VoIP), and wherein the communications network comprises an IP network, the obtained address is an IP address and the IP network is monitored for voice-over-IP call server registrations and de-registrations; (iv) WiFi, and wherein the communications network comprises a wireless IP network, the obtained address is an IP address and the IP network is monitored for WiFi associations and unassociations; and, (v) Bluetooth, and wherein the communications network comprises a wireless Bluetooth network, the obtained address is a Bluetooth address and the Bluetooth network is monitored for Bluetooth associations and unassociations; and,
a delivery module configured for receiving said obtained address and using said obtained address to communicate the message to said target recipient communications device.

2. The system of claim 1 wherein each said module comprises any one or more of the following: a single computer construct; a sub-module; a plurality of cooperating modules, sub-modules and/or agents; an agent framework operating a plurality of collaborating autonomous agents; and, an independent component of the system in communication with one or more other components of the system.

3. The system of claim 2 wherein the program instructions are executable by the one or more computer processors to further provide a dispatch module configured for receiving the message; for providing the selected target physical location; and, for selecting target recipient communications device specifications from a plurality of specifications each of which comprises one said obtained address of one said discovered recipient communications device.

4. The system of claim 2 further comprising a protocol tracking module configured for said monitoring said communications network for use of said predetermined communications protocol and said recipient communications device discovery module is further configured for discovering at least another target recipient communications device by obtaining from said protocol tracking module an address of at least another said recipient communications device, wherein said address obtained from said protocol tracking module is not one of said pre-registered addresses.

5. The system of claim 1 wherein at least one of said network sources is configured to provide a location service and the recipient communications device discovery module requests from the location service addresses of recipient communications devices accessible to that network source located in the selected target physical location.

6. The system of claim 1 wherein at least one said network source provides gateway services and the delivery module is configured for displaying the message on at least one said target recipient communications device unassociated with the network, the delivery module configured for providing the message in a network resource accessible to the target recipient communications device; and, transmitting to the target recipient communications device at least one network service announcement from an access point accessible to the at least one network source providing gateway services, the announcement containing at least one service identifier containing one of the message and an instruction for accessing the network resource wherein the message is displayed on the at least one target recipient communications device when the at least one target recipient communications device accesses the at least one network resource providing gateway services.

7. The system of claim 6 wherein the instruction includes an address of the at least one network resource and an offer to associate with said communications network, and the at least one target recipient communications device's operating environment automatically associates with said communications network.

8. The system of claim 7 wherein the at least one network resource is a web page containing the message and the message is displayed on the at least one target recipient communications device when the target recipient communications device opens a web browser and accesses that web page.

9. The system of claim 6 wherein each service identifier is prepended with sorting characters to cause the service identifier to be displayed at or near the top of any list of service identifiers displayed on the at least one target recipient communications device by an operating environment of the at least one target recipient communications device.

10. The system of claim 6 wherein the delivery module is configured to offer a new service named as the message to associated target recipient communications devices, wherein the operating environment of each said target recipient communications device causes the new service name to be displayed on the target recipient communications device.

11. The system of claim 2 wherein each said network source is selected from a group consisting of a wired LAN controller, a wireless LAN controller, a DHCP server, a DNS server, an SNMP server, an e-mail server, a geo-location service, a cellular location service, a VoIP call server, an intelligent switch, a router, a directory, a database, a gateway and a protocol packet; and, each said logical location is selected from a group consisting of a subnet, a VLAN, an access point, a switch port, a cell tower and an Internet hub.

12. The system of claim 3 wherein the dispatch module is configured to receive a specification of a target grouping identifying group member recipient communications devices; and, before the message is communicated, determining that on said target recipient communications device specification is for a group member recipient communications device, wherein the target grouping comprises a distribution listing, a directory or a list of users sharing a network service, each user being associated with at least one of the group member recipient communications devices.

13. The system of claim 1 wherein each said specification of a physical location associated with one said logical location is received from that logical location or from at least one of the network sources that logical location is accessible thereto.

14. The system of claim 1 wherein at least one said network source provides hostnames of recipient communications devices associated with at least one said logical location accessible to that network source, and said receiving a specification of a physical location associated with that logical location comprises resolving the physical location from a hostname of at least one of the recipient communications devices accessible to that logical location.

15. A computer-implemented method for discovering at least one target recipient communications device currently located in a target physical location selected from a plurality of selectable physical locations and communicating a message through a communications network to said target recipient communications device, the communications network comprising a plurality of network sources, at least one logical location accessible to each said network source and a plurality of recipient communications devices, each said recipient communications device being accessible to at least one said network source via at least one said logical location accessible thereto by a respective address for said recipient communications device, the method implemented by one or more computer processors having access to one or more databases comprising the selectable physical locations and a plurality of pre-registered recipient communications device addresses, the method comprising:

(a) receiving a specification of at least one said network source currently accessible to said one or more computer processors and querying said at least one network source for a specification of at least one logical location accessible to said at least one network source;

(b) receiving, for each said logical location identified by said querying of said at least one network source, a physical location associated with said logical location;

(c) updating said one or more databases to associate a specification of each said logical location with a specification of said physical location received for said logical location and said specification of said network source to which said logical location is accessible;

(d) identifying the at least one target recipient communications device after receiving a specification of the selected target physical location, comprising:

(i) retrieving from said one or more databases at least one said specification of said logical location associated with a specification of the selected target physical location and said specification of said associated network source; and, obtaining from said retrieved network source an address of at least one said recipient communications device currently accessible to said retrieved network source via said retrieved logical location, wherein said obtained address is not one of said pre-registered addresses and is obtained by monitoring the communications network for usage of a predetermined communications protocol indicating admission or availability of at least one said recipient communications device, wherein the predetermined communications protocol is one of the following: (i) DHCP, and wherein the communications network comprises an IP network and the obtained address is an IP address, wherein the IP network is monitored for DHCP IP address lease allocation and de-allocation packets and the logical location(s) and associated network source(s) having active IP address leases are identified; (ii) SNMP, and wherein the communications network comprises an IP network, the obtained address is an IP address and is retrieved from the payload of an SNMP Trap packet and wherein the IP network is monitored for SNMP Trap packets; (iii) voice-over-IP (VoIP), and wherein the communications network comprises an IP network, the obtained address is an IP address and the IP network is monitored for voice-over-IP call server registrations and de-registrations; (iv) WiFi, and wherein the communications network comprises a wireless IP network, the obtained address is an IP address and the IP network is monitored for WiFi associations and unassociations; and, (v) Bluetooth, and wherein the communications network comprises a wireless Bluetooth network, the obtained address is a Bluetooth address and the Bluetooth network is monitored for Bluetooth associations and unassociations; and, (e) receiving said obtained address and communicating the message to said target recipient communications device using said received address.

16. The method of claim 15 wherein at least one of said network sources is configured to provide a location service, the method comprising requesting from the location service addresses of recipient devices accessible to that network source in the selected target physical location.

17. The method of claim 15 wherein at least one said network source provides gateway services and the message is displayed on at least one said target recipient communications device unassociated with the communications network, the method comprising providing the message in a network resource accessible to the target recipient communications device; and, transmitting at least one network service announcement from an access point accessible to the network source to the target recipient communications device, the announcement containing at least one service identifier containing one of the message and an instruction for accessing the network resource wherein the message is displayed on the target recipient communications device when the target recipient communications device accesses the network resource.

18. The method of claim 17 wherein the instruction includes an offer to associate with said communications network and the target recipient communications device associates with said communications network.

19. The method of claim 18 wherein the instruction includes an address of the network resource and the message is displayed on the target recipient communications device when the target recipient communications device accesses that network resource address.

20. The method of claim 19 wherein the network resource is a web page containing the message and the message is displayed on the target recipient communications device when the target recipient communications device opens a web browser and accesses that web page.

21. The method of claim 17 wherein each service identifier is prepended with sorting characters to cause the service identifier to be displayed at or near the top of any list of service identifiers displayed on the target recipient communications device by an operating environment of the target recipient communications device.

22. The method of claim 15 wherein each said network source is selected from a group consisting of a wired LAN controller, a wireless LAN controller, a DHCP server, a DNS server, an SNMP server, an e-mail server, a geo-location service, a cellular location service, a VoIP call server, an intelligent switch, a router, a directory, a database, a gateway and a protocol packet; and, each said logical location is selected from a group consisting of a subnet, a VLAN, an access point, a switch port, a cell tower and an Internet hub.

* * * * *